(12) United States Patent
Logvinov et al.

(10) Patent No.: US 9,801,114 B2
(45) Date of Patent: *Oct. 24, 2017

(54) SYSTEM AND METHOD FOR AN ENERGY EFFICIENT NETWORK ADAPTOR WITH SECURITY PROVISIONS

(71) Applicant: STMicroelectronics, Inc., Coppell, TX (US)

(72) Inventors: Oleg Logvinov, East Brunswick, NJ (US); Aidan Cully, St. Augustine, FL (US); James D. Allen, Rochester, NY (US)

(73) Assignee: STMICROELECTRONICS, INC., Coppell, TX (US)

( * ) Notice: Subject to any disclaimer, the term of this patent is extended or adjusted under 35 U.S.C. 154(b) by 84 days.

This patent is subject to a terminal disclaimer.

(21) Appl. No.: 14/843,679

(22) Filed: Sep. 2, 2015

(65) Prior Publication Data

US 2015/0382274 A1 Dec. 31, 2015

Related U.S. Application Data

(63) Continuation-in-part of application No. 14/672,977, filed on Mar. 30, 2015, now abandoned, which is a
(Continued)

(51) Int. Cl.
*H04W 4/00* (2009.01)
*H04W 40/08* (2009.01)
(Continued)

(52) U.S. Cl.
CPC ......... *H04W 40/08* (2013.01); *H04L 41/0833* (2013.01); *H04L 43/0876* (2013.01);
(Continued)

(58) Field of Classification Search
CPC combination set(s) only.
See application file for complete search history.

(56) References Cited

U.S. PATENT DOCUMENTS 6,891,796 B1 5/2005 Manis et al.
6,917,888 B2 7/2005 Logvinov et al.
(Continued)

OTHER PUBLICATIONS

IEEE Standard for a Convergent Digital Home Network for Heterogeneous Technologies, Amendment 1: Support of New MAC/PHYs and Enhancements, IEEE Communications Society, IEEE Std 1905.1a-2014, Dec. 23, 2014, 52 pages.
(Continued)

*Primary Examiner* — Frank Duong
(74) *Attorney, Agent, or Firm* — Slater Matsil, LLP

(57) ABSTRACT

In accordance with an embodiment, a network device includes a network controller and at least one network interface coupled to the network controller that includes at least one media access control (MAC) device configured to be coupled to at least one physical layer interface (PHY). The network controller may be configured to determine a network path comprising the at least one network interface that has a lowest power consumption and minimum security attributes of available media types coupled to the at least one PHY.

21 Claims, 12 Drawing Sheets

Related U.S. Application Data continuation-in-part of application No. 13/631,504, filed on Sep. 28, 2012, now Pat. No. 8,995,280.

(60) Provisional application No. 61/558,752, filed on Nov. 11, 2011, provisional application No. 62/050,621, filed on Sep. 15, 2014.

(51) Int. Cl.
*H04W 52/02* (2009.01)
*H04W 52/46* (2009.01)
*H04W 40/10* (2009.01)
*H04L 12/801* (2013.01)
*H04L 12/24* (2006.01)
*H04L 12/26* (2006.01)

(52) U.S. Cl.
CPC ............. *H04L 47/13* (2013.01); *H04W 40/10* (2013.01); *H04W 52/0219* (2013.01); *H04W 52/46* (2013.01); *H04L 43/08* (2013.01); *Y02B 60/42* (2013.01); *Y02B 60/50* (2013.01)

(56) References Cited

U.S. PATENT DOCUMENTS

| | | | |
|---|---|---|---|
| 7,106,177 B2 | 9/2006 | Logvinov et al. | |
| 7,193,506 B2 | 3/2007 | Logvinov et al. | |
| 7,245,625 B2 | 7/2007 | Manis et al. | |
| 7,286,812 B2 | 10/2007 | Manis et al. | |
| 7,440,443 B2 | 10/2008 | Logvinov et al. | |
| 7,804,673 B2 | 9/2010 | Macaluso et al. | |
| 8,050,287 B2 | 11/2011 | Logvinov et al. | |
| 8,269,622 B2 | 9/2012 | Chan | |
| 8,576,929 B2 * | 11/2013 | Abad Molina | H04B 3/542 340/12.32 |
| 8,745,695 B2 * | 6/2014 | Newman | H04L 63/06 713/168 |
| 8,745,704 B2 * | 6/2014 | Bennett | H04B 3/54 370/310 |
| 2003/0071721 A1 | 4/2003 | Manis et al. | |
| 2003/0218549 A1 | 11/2003 | Logvinov et al. | |
| 2005/0043858 A1 | 2/2005 | Gelman et al. | |
| 2007/0177623 A1 | 8/2007 | Logvinov | |
| 2008/0205534 A1 | 8/2008 | Logvinov et al. | |
| 2013/0003746 A1 | 1/2013 | Klein | |

OTHER PUBLICATIONS

IEEE Standard for a Convergent Digital Home Network for Heterogeneous Technologies, IEEE Communications Society, IEEE Std. 1905.1-2013, Apr. 12, 2013, 93 pages.

Dijkstra, E.W., "A Note on Two Problems in Connexion with Graphs," Numerische Mathematik, Dec. 1, 1959, vol. 1, pp. 269-271.

IEEE Std. 1901-2010TM, "IEEE Standard for Broadband over Power Line Networks: Medium Access Control and Physical Layer Specifications," New York, NY: IEEE, Dec. 30, 2010, 1,586 pages.

Lasar, M. "Internet Bandwidth Report: Have we Reached 'Peak Netflix?,'" Law & Disorder/Civilization & Discontents, Oct. 27, 2011, http://arstechnica.com/tech-policy/2011/10/netflix-accounts-for-nearly-one-third-of-north-american-web-traffic, 2 pages.

TIA/TR-30.1, TIA 1113, "Medium-Speed (up to 14 Mbps) Power Line Communications (PLC) Modems using Windowed OFDM," May 2008, Telecommunications Industry Association, 182 pages.

* cited by examiner

SYSTEM AND METHOD FOR AN ENERGY EFFICIENT NETWORK ADAPTOR WITH SECURITY PROVISIONS

This application claims the benefit of U.S. Provisional Application No. 62/050,621 filed on Sep. 15, 2014, entitled "System and Method for an Energy Efficient/Security Aware Network Adaptor," and is also a Continuation in Part of U.S. Non-Provisional application Ser. No. 14/672,977 filed on Mar. 30, 2015, entitled "System and Method for an Energy Efficient Network Adaptor with Security Provisions", which is a Continuation in Part of U.S. Non-Provisional application Ser. No. 13/631,504 filed on Sep. 28, 2012, entitled "System and Method for an Energy Efficient Adaptor", which claims the benefit of U.S. Provisional Application No. 61/558,752 filed on Nov. 11, 2011, entitled "System and Method for an Energy Efficient Network Adaptor", which applications are hereby incorporated by reference herein in their entirety.

TECHNICAL FIELD

The present invention relates generally to networking systems, and more particularly to a system and method for an energy efficient network adaptor with security provisions.

BACKGROUND

As networked devices have become cheaper and more capable, the market for these devices has exploded. Further, users are demanding greater speeds, better performance, and seamless operation from these devices. User demand for better QoS and high network availability coupled with device interoperability is driving the development of devices with multiple network interfaces, and standards for integrating multiple interfaces into a single home area network. Proliferation of devices and network interfaces means that power consumption of the network interface becomes an increasingly relevant concern for device owners and operators.

Power consumption has several negative user-visible effects, some of which include: it is a significant contributor to the long-term cost of ownership of a device; it reduces battery life and increases the cost and complexity of the power supply; and it can raise device temperature, potentially increasing design size and complexity to accommodate more powerful cooling mechanisms. Device power consumption can be reduced by reducing effective clock speed and by disabling components of the device for the period in which they are not in use. These techniques are more difficult to apply to the networking layer of a given device, as designs often assume that network requests will be unpredictable.

SUMMARY OF THE INVENTION

In accordance with an embodiment, a network device includes a network controller and at least one network interface coupled to the network controller that includes at least one media access control (MAC) device configured to be coupled to at least one physical layer interface (PHY). The network controller may be configured to determine a network path comprising the at least one network interface that has a lowest power consumption, and security attributes of available media types coupled to the at least one PHY.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

For a more complete understanding of the embodiments, and the advantages thereof, reference is now made to the following descriptions taken in conjunction with the accompanying drawings, in which.

Figure 1:
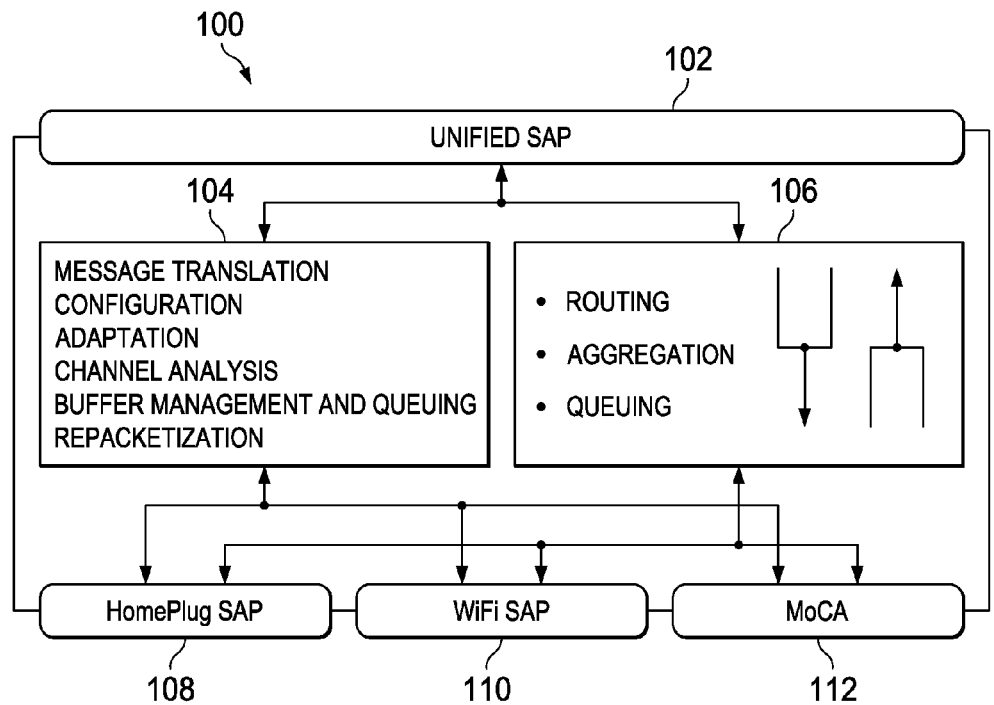
FIG. 1 is a block diagram of a hybrid network system.

Corresponding numerals and symbols in different figures generally refer to corresponding parts unless otherwise indicated. The figures are drawn to clearly illustrate the relevant aspects of the preferred embodiments and are not necessarily drawn to scale. To more clearly illustrate certain embodiments, a letter indicating variations of the same structure, material, or process step may follow a figure number.

DETAILED DESCRIPTION OF ILLUSTRATIVE EMBODIMENTS

The making and using of the embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to embodiments in specific contexts, for example, a system and method for an energy efficient network adaptor in a hybrid network. Embodiment systems and methods, however, are not limited to hybrid networks, and can be applied to other types of networking systems.

In embodiments, a hybrid network approach leveraging multiple MAC/PHY stacks, such as the IEEE 1905.1-2013 [IEEE 1905.1] and IEEE 1905.1a-2014 [IEEE 1905.1a or generally IEEE 1905.1] standards, may reduce power consumption, by allowing communications to proceed along lower power paths when possible, and by disabling supplemental communications channels when the user does not require additional network capacity.

In some embodiments, link level security may also be added to the path (link) decision process by not routing to paths the do not meet the security requirements such as a level of security or end-to-end security and/or using paths whose security mechanisms consume the least amount of power.

In some embodiments, power optimization is performed such that reducing device functionality is reduced in such a way that QoS is not compromised. In other words, some embodiment power optimization methods include strategically reducing certain device capabilities when these certain capabilities are not required; increasing capability only when required to do so, and only to the extent required; and, when the same function can be performed in multiple ways, choosing the most efficient method for the intended purpose.

In some embodiments, power consumption optimization uses the following information: when system clients will require some function from the system; the level at which system clients require that function to be performed; the energy required to communicate those requirements and data to relevant parts of the system; and how much time and energy it takes to change the capability level of the system. Some embodiment power consumption optimization processes comprise maintaining this set of information, developing the historical knowledge that may be analyzed to detect trends and patterns as an example, and of acting on it.

Generally, embodiments of the present invention involve scheduling and selecting data transmission paths in hybrid systems having multiple-network interfaces. For example, IEEE standard and subsequent amendments (e.g. 1905.1a, 1905.1b, etc.), "1905.1 —Standard for a Convergent Digital Home Network for Heterogeneous Technologies" supports a converged digital home network (CDHN). Some embodiments include an abstraction layer for multi-network-interface devices operating in a home network for the purpose of providing a common data and control interface to heterogeneous network technologies including: Wi-Fi (IEEE 802.11x where the "x" indicates any of various lettered versions), Ethernet (IEEE 802.3), ZigBee (IEEE 802.15.4 series), Bluetooth protocol (e.g. Bluetooth Specification 4.1), MoCA 1.1, and HomePlug AV 1.1 (i.e., part of IEEE 1901-2010™ [IEEE 1901]). The abstraction layer common interface allows applications and upper layer protocols to be agnostic to the underlying home network technologies.

FIG. 1 illustrates an embodiment of the IEEE 1905.1 Standard implemented as an abstraction layer. Block diagram 100 shows the abstraction layer with unified Service Access Point (SAP) 102 performing a variety of functions in blocks 104 and 106 to achieve the convergence, abstraction, and unification of previously standalone SAPs specific to each media, such as HomePlug 108, Wi-Fi 110 and MoCA 112. The block diagram 100 may be referred to as a hybrid network structure 100. In some embodiments of the present invention, hybrid network structure 100 may include greater, fewer and/or different network types and functions.

Figure 2:
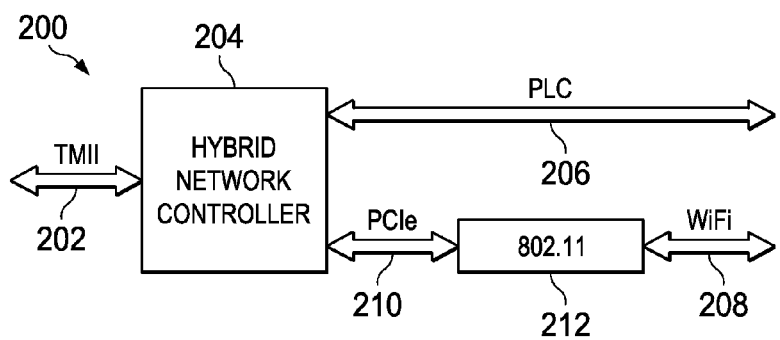
FIG. 2 illustrates a hardware block diagram of a hybrid network system.

FIG. 2 illustrates a hardware block diagram hybrid network system 200 showing Turbo Media Independent Interface (TMII) 202 coupled to hybrid network controller 204 that outputs power line communication (PLC) signal 206 at one interface and a Wi-Fi signal 208 at another interface. In one embodiment, the Wi-Fi signal 208 is produced by 802.11x adaptor 212 that is coupled to hybrid network controller 204 via PCIe interface 210. It should be understood that the diagram of FIG. 2 depicts just one example of a hybrid network system. Other embodiment hybrid systems may have any number of network interfaces of various network interface types. For example, this may include a standalone PLC Interface coupled to the controlled 204 via a PCIe interface coupled in the same fashion as block 212. Alternatively, a fully integrated device may be implemented such that controller 204 also includes some or all of the functionality of adaptor 212.

Figure 3A:
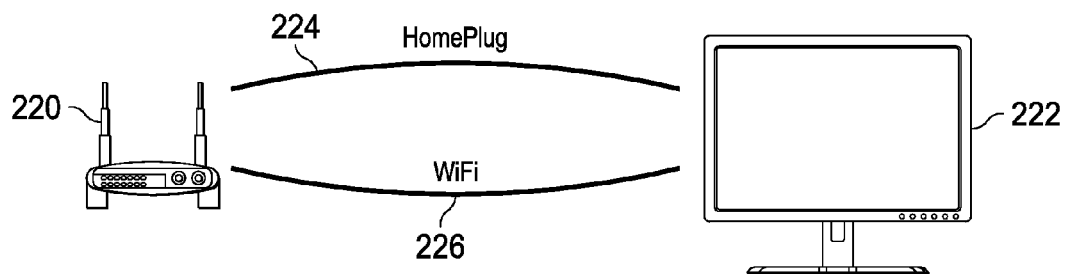
FIGS. 3a-b illustrate implementation examples of a hybrid network system.
Figure 3B:
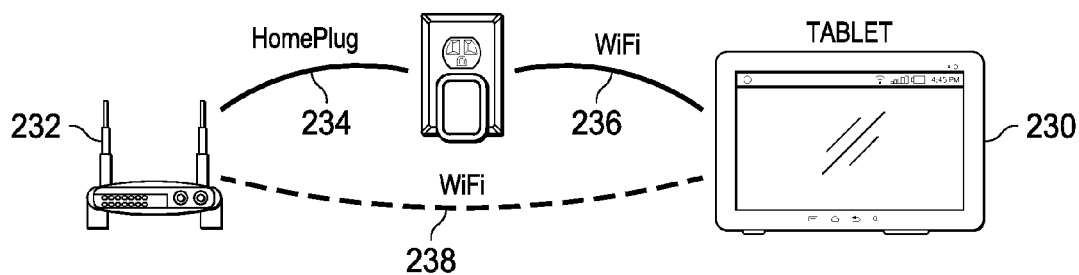

Hybrid networks, such as IEEE 1905.1 may be used, for example, to provide multipath data communication in which data is transmitted via multiple network connections, as is illustrated in FIG. 3a showing router 220 communicating with television 222 via HomePlug network connection 224 and a Wi-Fi network connection 226. Hybrid network systems may also be used to extend range as shown in FIG. 3b, in which tablet computer 230 is coupled to router 232 via a series connection of HomePlug network connection 234 and a Wi-Fi network connection 236. In an embodiment, this series connection may be used in place of single Wi-Fi network connection 238. It should be appreciated that the network types and device types shown in FIGS. 1-3 are only specific representative examples of the hybrid network configurations that may be used in embodiments of the present invention. Other configurations using other different network types and connection topologies may be used.

Figure 4A:
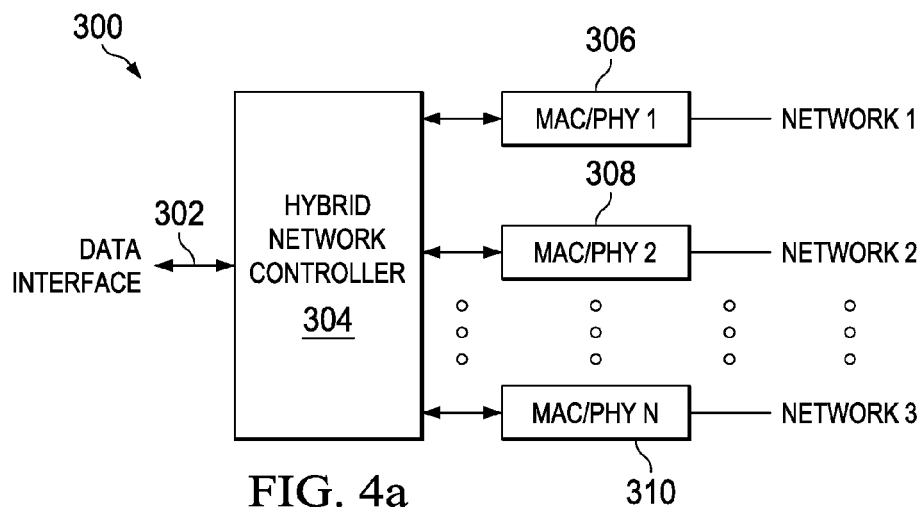
FIGS. 4a-b illustrate embodiment systems.

FIG. 4a illustrates an embodiment of adapter system 300. Data interface 302 (that may also be a SAP) is coupled to controller 304 that is further coupled to network interfaces 306, 308 and 310. These network interfaces may comprise a number of different MAC and PHY blocks, or they may comprise a single MAC block and the plurality of PHY blocks coupled to the MAC block. These blocks may also be a single device which is dynamically adaptable as described in US Pat. No. 7,440,443, entitled, "Coupling between power line and customer in power line communication system" and as described in U.S. Pat. No. 8,050,287, entitled, "Integrated universal network adapter," which are hereby incorporated within in their entirety. Controller 304 inputs and outputs data to and from the data interface and determines over which of network interfaces 306, 308 and 310 to transmit and receive data based on power control operation and other parameters including QoS, as well as methods described herein. Data may be sent and received over the various MAC/PHY blocks simultaneously to utilize multiple media types coupled to said blocks, including such transmissions where packets are interleaved and/or repeated among multiple media types. In some embodiments, packets presented to the various MAC/PHY blocks such as blocks 108, 110, and 112 illustrated in FIG. 1 do not necessarily correspond to the packets presented at the Unified SAP layer 102, as they may undergo translation and re-packing.

In an embodiment, some of the MAC functions that traditionally reside in the media specific MAC are aggregated into a unified MAC engine performing said functions for multiple media types and further integrated with a CDHN type of functionality. Typically a MAC performs a lot of queuing and buffer management to deal with the QoS requirements and traffic prioritization/shaping. In some embodiments, the MAC may also perform packet retransmission and reordering. In the case of a single integrated engine performing both CDHN and multiple MAC functions, the size of the required memory may be reduced due to a reduction in the number of queues and buffers and sharing of the resources among multiple media specific interfaces. For example, in one embodiment, MAC queues may be eliminated and CDHN queues may be used for all purposes. At the same time, a single instance of a CPU may manage multiple media specific MACs, thereby providing a reduction in cost and complexity.

In an embodiment, the controller may also determine the state of power saving modes, such as clock frequency control, and power down states for various processing blocks and for the different MAC and PHY blocks. In some cases, the controller may also schedule intervals of time during which the network interface is not allowed to transmit or is scheduled to be powered down. The determination made by the controller may include determining which power saving strategies to use as well as issuing commands and control signals to implement these power management strategies. Moreover, the determination of power management strategies may be made in various combinations in order to meet the requirements of a particular user, or a particular type of network or network use case scenario. For example, if a content source is transmitting video and audio to a playback device, the audio content may be transmitted over a different link from the video content. Because audio and video have different bandwidth requirements, the links may be optimized further than if they were transmitted in the same stream or were different streams over the same links.

Figure 4B:
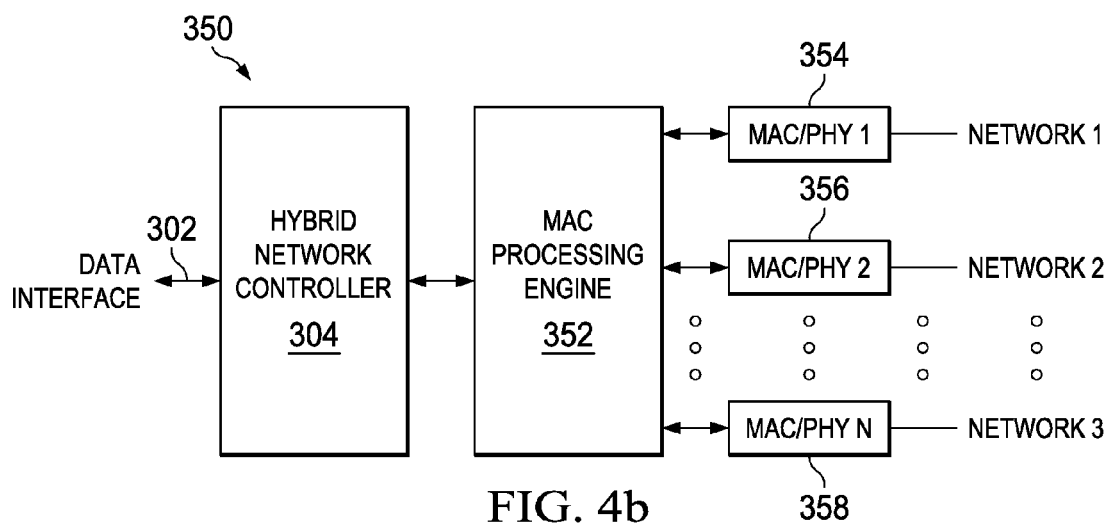

FIG. 4b illustrates adapter system 350 according to an alternative embodiment. System 350 is similar to system 300 depicted in FIG. 4a with the addition of MAC processing engine 352. In an embodiment, MAC processing engine 352 may perform queuing functions among multiple media specific MACs in the system. For example MAC processing engine 352 may aggregate queuing functions that otherwise would be residing in media specific MACs residing in MAC/PHY blocks 354, 356 and 358. Advantages of such an embodiment include the ability to further reduce the size and complexity of a system implementation.

In an embodiment, MAC processing engine 352, performs MAC functions that are common or similar among multiple media specific MACs in the system. As an example, it could aggregate all the queuing that otherwise would be residing in media specific MACs with the queuing necessary for the abstraction layer into a single optimized engine that further allows to reduce the size and complexity of the whole implementation.

The systems shown in FIGS. 4a-b may be implemented on a single integrated circuit, or may be implemented using multiple integrated circuits, or other components known in the art. The controller may be implemented using a microprocessor, microcontroller, custom logic, or other circuitry known in the art. In some embodiments, operation of the controller may be software programmable, implemented in hardware with or without being configurable and/or programmable, or combination of the two.

In some embodiments, power may be reduced in four domains: in a single network interface in a single device; in a single network interface across all devices sharing that network; in multiple network interfaces in a single device; and in multiple network interfaces across the union of the devices that can communicate using these networks. Accordingly, in some embodiments, power may be reduced: within a single MAC/PHY implementation on a single device; within a single MAC/PHY implementation across a whole network; across multiple MAC/PHY implementations on a single device; and across multiple MAC/PHY implementations across a whole network. While embodiments are described herein with respect to IEEE 1901 (as an example of a network MAC/PHY), and IEEE 1905.1-2013 (as an example of a hybrid network), embodiments are broadly applicable beyond these specifically described contexts.

The IEEE 1901 standard defines a MAC/PHY for PLC, including provision for Time Division Multiple Access (TDMA) and Carrier Sense Multiple Access (CSMA) modes for medium coordination. IEEE 1901 networks include a single network management node, called the BSS Manager, which provides a stable clock reference for other devices on the network, and which coordinates the allocation of TDMA and CSMA periods for device communications.

Figure 5:
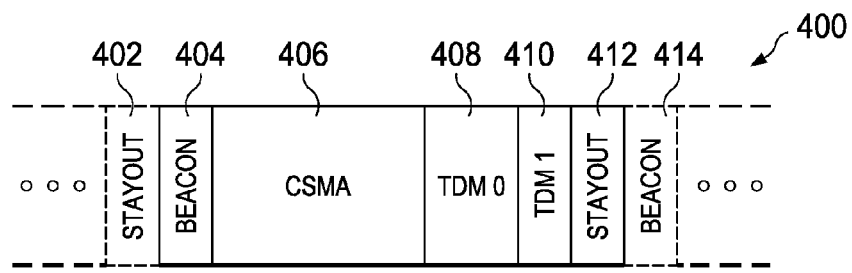
FIG. 5 illustrates an example Beacon period configuration for IEEE 1901.

TDMA regions in IEEE 1901 are managed by the BSS Manager, and communicated to network stations through the Persistent and Non-persistent Schedule BENTRYs in network Beacons. To communicate in a TDMA region, a station must characterize the network traffic that could occur in a TDMA region in a Traffic Specification (TSPEC), and present this TSPEC to the BSS Manager in a TDMA allocation request. FIG. 5 illustrates an example Beacon period configuration for IEEE 1901.

Figure 6:
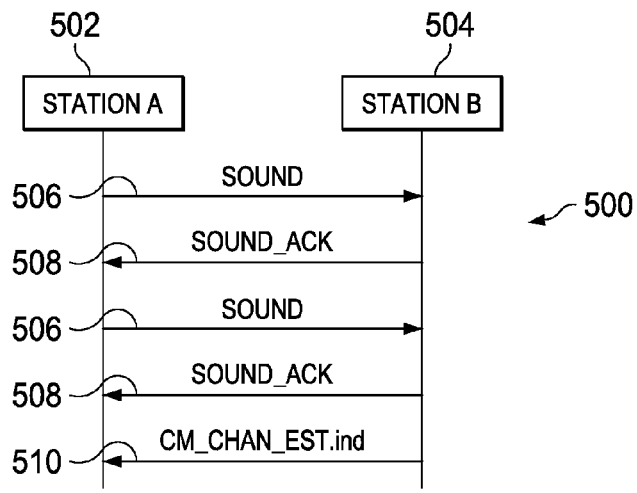
FIG. 6 illustrates a conventional radio parameter negotiation process.

Diagram 500 illustrating a radio parameter negotiation is illustrated in FIG. 6. In IEEE 1901 networks, unicast communications parameters are the product of a negotiation between the source represented as Station A 502 and destination represented as Station B 504. In the negotiation process, Station A 502 first sends a SOUND frame 506 to Station B 504. On receiving a SOUND frame, Station B 504 collects information about receive fidelity for that frame from the PHY. This information is used to calculate the radio configuration information (or "tone-map") that Station A 502 should use for future communications with Station B 504. Station B 504 responds to the SOUND frame with a SOUND_ACK 508, indicating whether or not Station A should send more SOUND frames 506 before tone-maps can be returned to Station A 502. After enough information is collected, Station B 504 will send a CM_CHAN_EST.indication message 510 to Station A 502. This message includes the set of tone-maps that Station A 502 should use for future transmissions to Station B 504.

Though the IEEE 1901 PHY is designed to be capable of up to 4096-QAM modulation, a large percentage of the medium time will be of a form that requires much less transmitter and receiver accuracy. During such periods, the PHY clock may run at reduced rate, thereby saving power.

At times during which no station is transmitting (the medium is Idle), the PHY may only need sufficient accuracy to detect the beginning of a Priority Resolution Symbol (PRS) (during the PRS window) or a preamble. After detecting a PRS, the PHY need not receive any additional medium signals until the current PRS period ends. On the other hand, receiving payload requires increasing receiver fidelity as the MAC Protocol Data Unit (MPDU) is processed: the beginning of the preamble may be detected more simply than the preamble-to-Frame Control boundary; and it is simpler to detect the end of the preamble than to decode the frame control or payload data. In an embodiment, simpler parts of MPDUs may potentially be transmitted and received at a reduced sampling frequency, thereby saving power. For example, in an embodiment, initial preamble detection (and PRS detection) may run at lower sampling frequency than the preamble-boundary detection.

Figure 7:
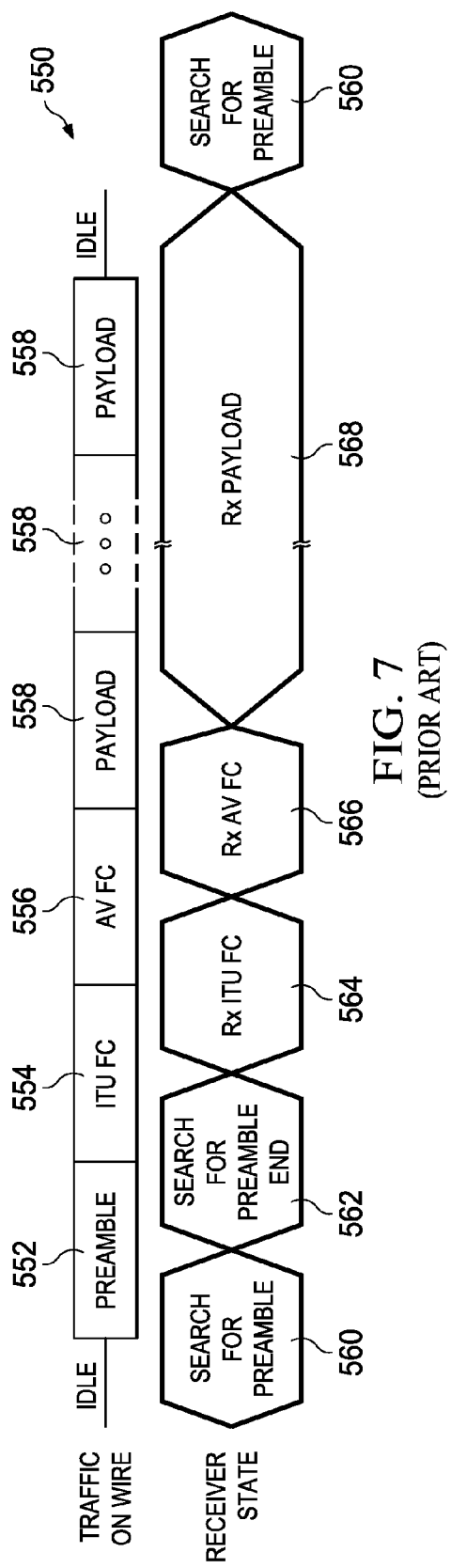
FIG. 7 illustrates an MPDU format and receive state diagram.

FIG. 7 illustrates MPDU format and receive state diagram 550. The receiver starts out searching for preamble state 560 while the traffic on the wire is idle. When the receiver receives preamble 552, the receiver transitions to search for preamble end state 562. At the reception of Telecommunications Industry Association (TIA) Frame Control (FC) 554, the receiver transitions to a receive TIA FC 564 state until the reception of AV FC 566, in which case the receiver transitions to receive AC FC state. These TIA FC messages comply with the standard "TIA/TR-30.1, TIA 1113: A Medium Speed (Up to 14 Mbps) Power Line Communications (PLC) Modem, May 2008" [TIA 1113], which is incorporated herein in its entirety. Once payload frames 558 are received, the receiver transitions to receive payload frame state 568. At the conclusion of the reception of payload frames 558, the receiver once again assumes search for preamble state 560.

Reducing the sampling clock rate may have a beneficial effect on power consumption; and disabling the receive logic entirely may have an even greater positive effect. This entails identifying periods in which no valid data should be received. Such periods may be referred to as "Receiver Irrelevant Periods" or RIPs.) Some RIPs are trivially identified (such as when the station itself is the transmitter or during inter-MPDU intervals), some will occur due to the staged nature of the receive operation and others are dependent on individual station properties and the region-type in the Beacon period.

Some RIPs include the time between detection that the MPDU data on the wire is irrelevant to the receiver, and the expiration of the receiver's virtual carrier sense timer for that MPDU. This may happen in at least two ways: early stage receive-operations for the MPDU data can fail (preventing later stage receipt—e.g. failure to detect the end of a preamble can prevent frame control receipt, and frame control decode failure can prevent payload receipt); or early stage MPDU data can indicate that the local receiver is not the intended recipient. For example, the destination terminal equipment identifier, or the short network identifier in an AV Start-of-Frame frame control may not match the local device's configuration. In either case, the frame is guaranteed not to be destined to the local device, and may be ignored in some embodiments of the present invention.

Other RIPs may be determined by the Beacon region allocation. In general, stations not participating in a particular global or local link are not active on the medium during the TDMA regions allocated to these links. (An exception is the BSS manager or proxy BSS manager, which needs to listen to medium activity during TDMA regions, for accounting and maintenance purposes.) Stations do not generally need to listen to the medium during Stayout or Protected regions, and only the BSS Manager will generally need to listen to the medium during Beacon regions for foreign networks.

As previously described, during Stayout or Protected regions, stations neither transmit nor receive the network payload. As such, the rate of power consumption may be significantly reduced during these regions. The IEEE 1901 BSS Manager station controls the overall structure of the Beacon region. FIG. 5 illustrates an example Beacon region configuration 400 having Stayout regions 402 and 412, Beacon regions 404 and 414, CSMA region 406 and TDM regions 408 and 410. By reducing the size of CSMA region 406, and increasing the size of a Stayout region 402 or 414, the BSS Manager may reduce power consumption across every device in the IEEE 1901 network.

Reducing the size of CSMA region 406 will reduce the available bandwidth for the whole network, which may reduce user-perceived network performance. In an embodiment, this concern may be partially addressed by having the BSS manager observe medium utilization during the CSMA period. When usage drops below a certain threshold for a sufficient period of time, the BSS Manager might increase the duration of Stayout region 402 or 414 and decrease the duration of CSMA region 406. If the usage exceeds a different threshold for a sufficient period of time, the BSS manager may perform the reverse operation, making more time available for network traffic during CSMA.

The tone-map used for communications may have some impact on the power consumption of the transmitter. For example, high-bandwidth tone-maps may require more power per active transmission time than a low-bandwidth tone-map, due to the larger amount of data processed. High-bandwidth tone-maps may also require less active transmission time on the medium than low-bandwidth tone-maps. As placing transmit data on the medium requires more energy than polling the medium for MPDUs to receive, this implies that, at the signal-generation level, higher-bandwidth tone-maps will generally save energy over low-bandwidth tone-maps per unit transmitted data. When it is possible to choose from a set of tone-maps for transmission, embodiment power consumption may be reduced by using that tone-map that will result in: first, the lowest amount of energy being placed on the medium; and second, the lowest energy required to encode the data. In practice, this will usually mean determining which tone-maps will occupy the shortest period of time on the medium, and then choosing the lowest-bandwidth tone-map from that set.

In an embodiment, reducing the energy in the transmitted signal may also help in reducing power consumption in a device. While a uniform reduction in transmission amplitude likely decreases the signal-to-noise ratio (SNR) at the receiver, harming QoS, strategically reducing the transmitter amplitude in specific frequency ranges can reduce the power required to transmit an MPDU, and will not degrade—and may even improve—receiver performance in some embodiments. An embodiment transmitter may exploit this opportunity by reducing the transmit amplitude on inactive frequencies in the tone-map. This may be improved further, by modifying the tone-map negotiation process at the IEEE 1901 network level. Such a technique is described below.

Any IEEE 1901 Long MPDU requires communications overhead beyond what is strictly necessary for communicating payload: it includes an MPDU header; transmission of the MPDU may introduce padding into the frame stream; and a receiver will usually be expected to transmit a response MPDU. Therefore, reducing the number of MPDUs required for a given volume of payload may improve the efficiency of the IEEE 1901 network. In some cases, a station will be able to determine that data available for transmission is not immediately required by the destination. In such a case, the station may defer transmission until either the recipient requires the data, or enough data has accumulated so that the outbound transmissions would be optimally efficient.

Figure 8:
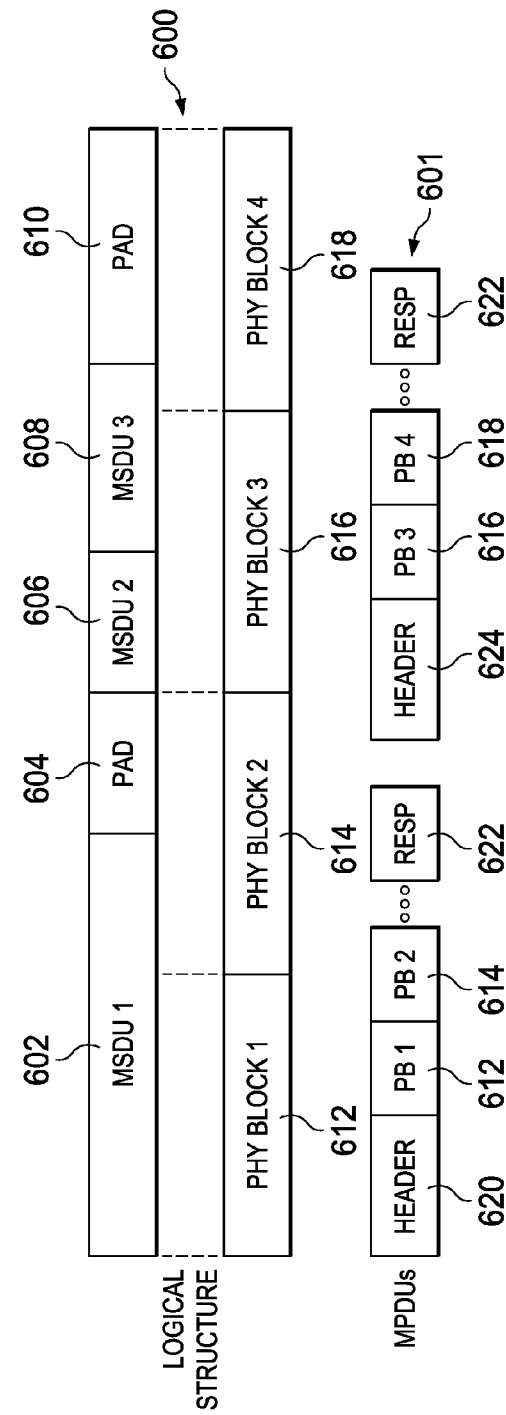
FIG. 8 illustrates a logical structure and corresponding MPDUs for a latency optimized transmission.

FIG. 8 illustrates logical structure 600 and corresponding MPDUs 601 for a latency optimized transmission. In logical structure 600, MSDUs 602, 606 and 608 are mapped into PHY blocks 612, 614, 616 and 618 along with Pad regions 604 and 610, such that Pad region 604 extends to the end of PHY block 614. In the resulting MPDUs PHY blocks 612 and 614 follow header 620, and PHY blocks 616 and 618 follow header 624 separated by response block 622.

Figure 9:
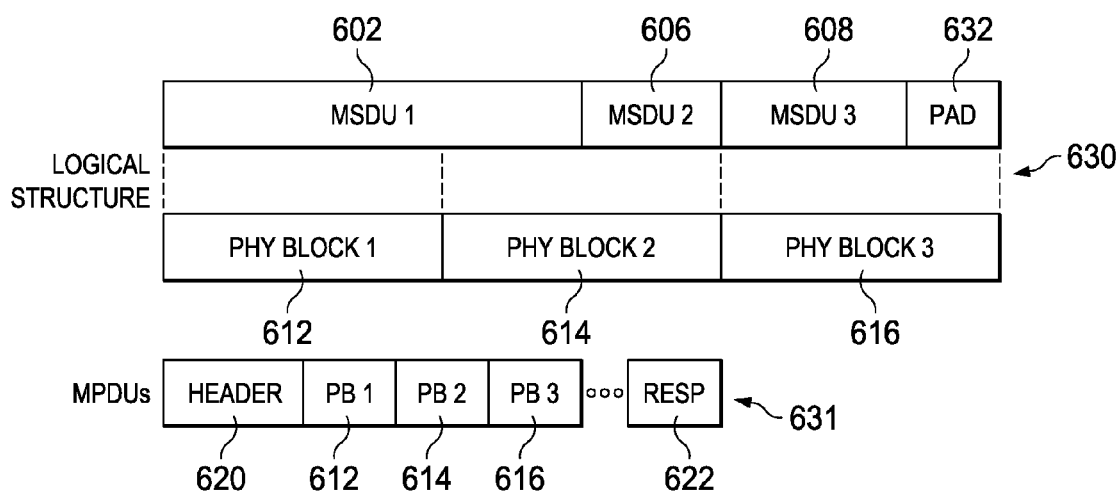
FIG. 9 illustrates a logical structure and corresponding MPDUs for an efficiency optimized transmission.

FIG. 9 illustrates a logical structure 630 and corresponding MPDUs 631 for an efficiency optimized transmission. In logical structure 630, MSDUs 602, 606 and 608 are mapped into PHY blocks 612, 614 and 616 along with Pad regions 632, such that Pad region 632 extends to the end of PHY block 616. In the resulting MPDUs PHY blocks 612, 614 and 616 follow header 634, followed by response block 622.

All TDMA regions have an expected traffic pattern (where the traffic pattern includes such aspects as expected medium usage, the two communications endpoints). Within a TDMA region, the receiving station will always know the identity of the transmitting station. As such, the receiver may improve its fidelity and decrease its activity by pre-configuring the radio to receive from this specific transmitter. For example, the signal quality from the transmitter to the receiver is not likely to change very frequently; the receiver can rely on this to pre-program the gain it expects to apply for this transmitter, prior to the transmitter sending any payload on the wire. This will simplify the dynamic receive behavior, improving performance while slightly reducing power consumption.

In embodiments of the present invention, various embodiment techniques may be used that may improve power consumption at the network level. In some embodiments, these improvements involve coordination between multiple devices, and enhancements may be made to the IEEE 1901 protocol to achieve these enhancements. It should be further understood that similar embodiment enhancements may also be to other systems and protocols.

Figure 10:
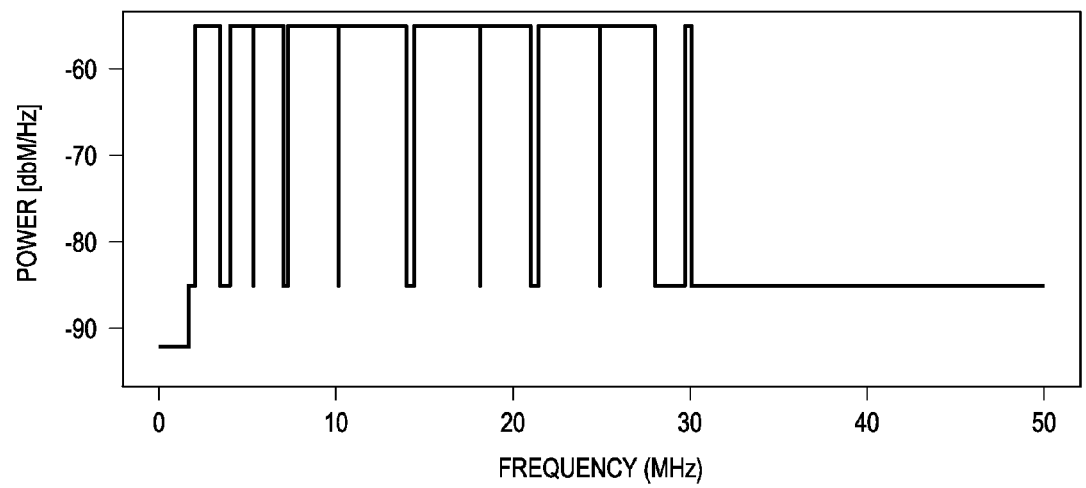
FIG. 10 illustrates a spectral plot showing the maximum per-frequency energy distribution of a transmission at a transmitter.
Figure 11:
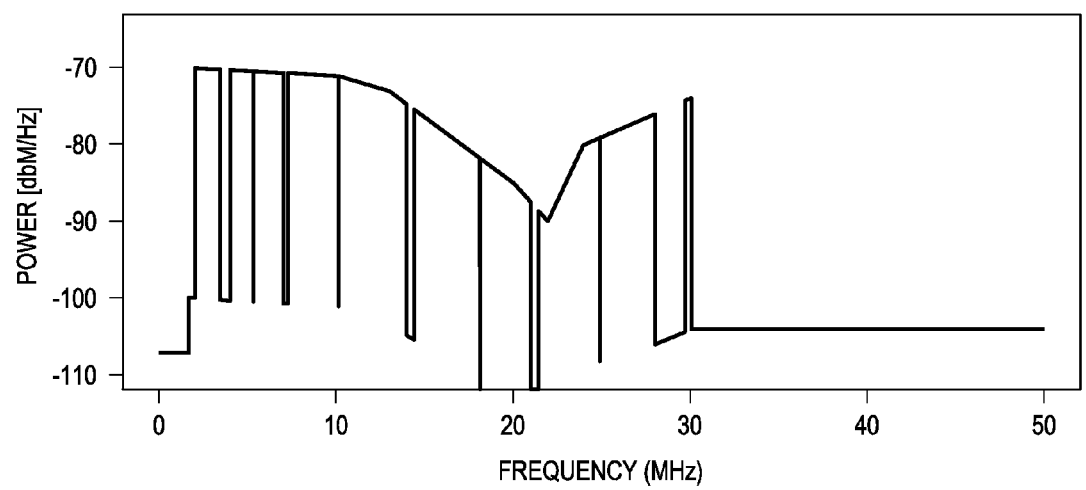
FIG. 11 illustrates a spectral plot showing an example energy distribution at a receiver.

A given IEEE 1901 station will generally use constant amplitude for all of its transmissions. This means that the transmitter will be perceived as louder or quieter to different receivers, depending on signal attenuation along the path from the transmitter. For any given receiver, the signal attenuation generally will not be uniform across all frequencies: some frequency ranges will show more attenuation than others. For example, FIG. 10 illustrates a power spectral density plot showing the maximum per-frequency energy that can be transmitted, while FIG. 11 illustrates a power spectral density plot showing an example energy distribution at a receiver for that transmission. In this example, all frequencies show at least 15 db of attenuation at the receiver, and there is a null around 24 MHz.

Receivers normalize the transmission by applying a gain to the received signal, so that the ADC from the AFE will present the maximum possible range, while avoiding clipping. This generally improves receiver accuracy, making higher-bandwidth modulations available to the transmitter. However, the gain is generally applied in a uniform manner across all frequencies. This means that receivers will usually see improved accuracy in less-attenuated frequency ranges, and less accuracy in more-attenuated frequency ranges.

Figure 12:
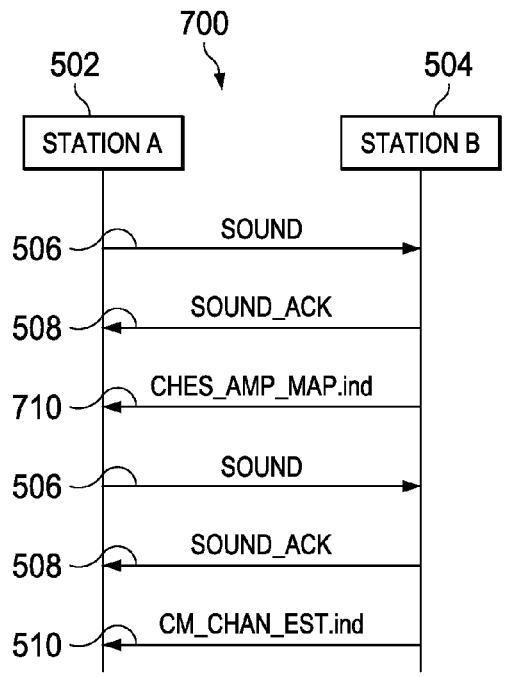
FIG. 12 illustrates an embodiment channel estimation process with amplitude negotiation.
Figure 13:
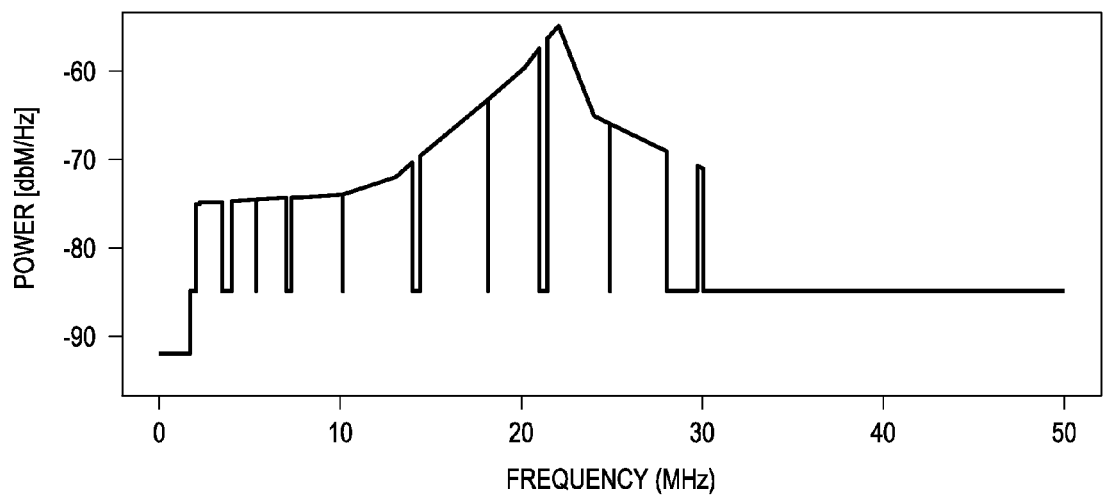
FIG. 13 illustrates a spectral plot of an adjusted transmit amplitude according to an embodiment system.
Figure 14:
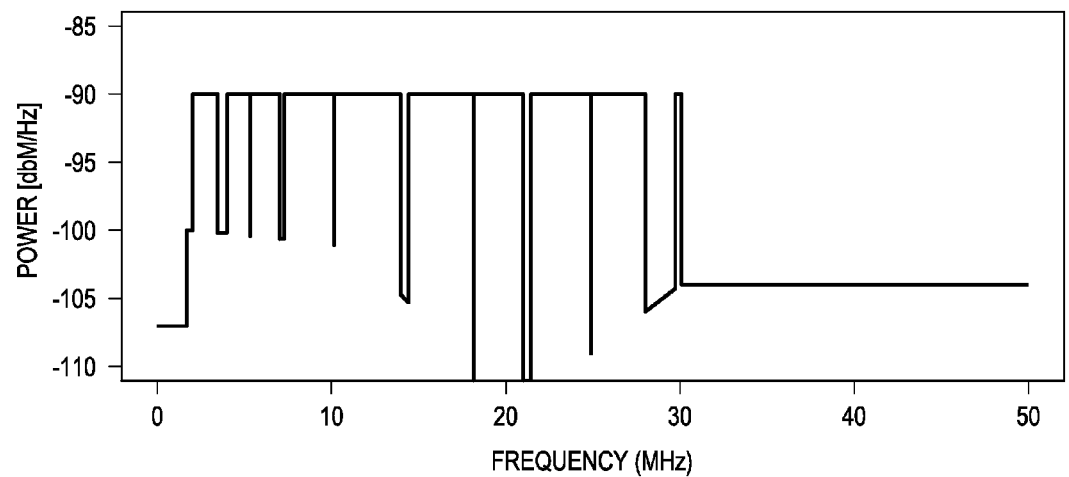
FIG. 14 illustrates a plot of a received frequency energy distribution with adjusted transmit amplitude according to an embodiment system.

FIG. 12 illustrates embodiment channel estimation process 700 with amplitude negotiation. Here the receiver response may be improved, and the transmitter may emit less energy on the medium, by including transmit amplitude negotiation in the channel estimation process. The receiver represented by Station B 504 detects the energy levels at different channels in SOUND frame 506, and forwards this information to the transmitter in a new Management Message Entry (MME), which is called CHES_AMP_MAP.indication 710. The transmitter, represented by Station A 502, on receiving this MME, may adjust its amplitude map in such a way that the receiver observes a flatter energy distribution across frequencies by increasing the gain-adjusted usability of channels that had previously been relatively faint. A power spectral density plot of an adjusted transmit amplitude is illustrated in FIG. 13, and a power spectral density plot of a resulting receive frequency energy distribution with adjusted transmit amplitude is shown in FIG. 14.

This process trades off a lower SNR for an improvement in the digital output resolution of lower-energy carriers. In an embodiment, to ensure that the transmitter has enough information to make the appropriate tradeoff, the CHES_AMP_MAP.indication 710 MME may also include collected per-frequency SNR data.

IEEE 1901 receivers use the preamble to identify the start of modulated payload, and to determine the gain value that should be applied to the received signal after the preamble is detected. The amount of time this takes may vary, depending on the gain adjustment technique used, and on the amplitude of the signal at the receiver. In general, the larger the difference between the gain setting when the medium is idle and the target gain setting for the receive operation, the longer the time it will take for the gain to reach its target value. If the gain does not reach a target value early enough in the receive operation, data demodulation may be compromised in some cases.

Figure 15:
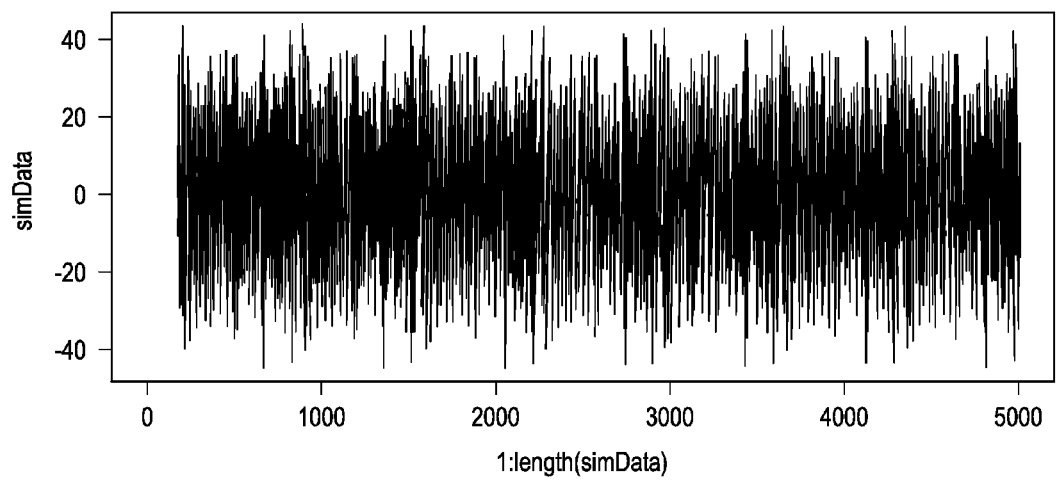
FIG. 15 illustrates an example preamble waveform at the transmitter.
Figure 16:
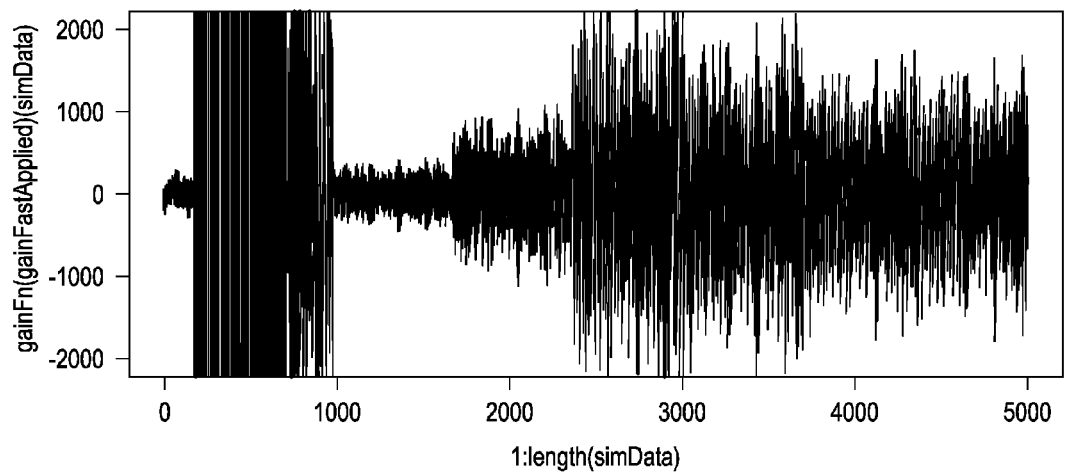
FIG. 16 illustrates a received preamble waveform using a slow gain adjustment.
Figure 17:
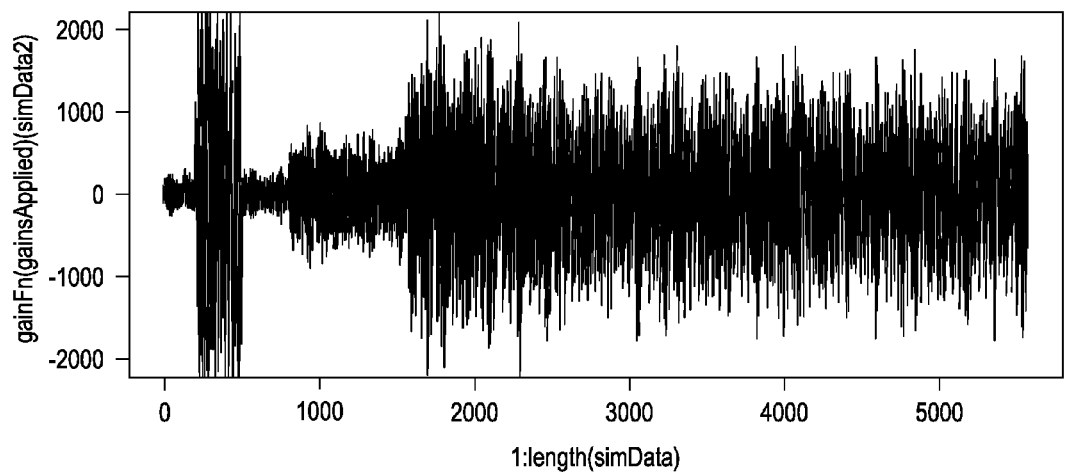
FIG. 17 illustrates a received preamble waveform using a fast gain adjustment.

FIG. 15 shows an example preamble waveform at the transmitter. FIG. 16 illustrates the received preamble waveform using a slow gain adjustment at a first receiver designated as "Station A," and FIG. 17 illustrated the received preamble waveform using a fast gain adjustment at a second receiver designated as "Station B." At the beginning of both FIGS. 16 and 17, both Stations A and B have the gain at maximum value while there is no signal on the medium. In an embodiment, this facilitates receiving the faintest possible MPDU. Station B hears the preamble much more faintly than does Station A, so it takes less time to adjust its gain to the target value. This means that the Station B may use more of the preamble than can Station A, and that some of this extra preamble data may be unnecessary for decoding the data. Had the transmitter been issuing a unicast transmission to Station B, and had it sent a shortened preamble, less energy would have been placed on the medium, and Station B would still be able to decode the transmission. In an embodiment, a receiver measures the amount of time spent adjusting its gain, and reports this time to the transmitter as part of a CM_CHAN_EST.indication. The transmitter may then use this information to shorten outbound preambles for the destination.

The amount of energy it takes to communicate a MPDU in an IEEE 1901 network may be expressed as follows:

$$E_{MPDU} = E_{sym} N_{sym} + K_{MPDU} \quad (1)$$

where $E_{MPDU}$ is the amount of energy it takes to communicate the MPDU; $E_{sym}$ is the amount of energy required to communicate each data symbol; $N_{sym}$ is the number of data symbols to be transmitted; and $K_{MPDU}$ is some constant amount of energy for communicating the non-varying parts of the MPDU. Both $E_{sym}$ and $N_{sym}$ are influenced by the radio parameters used to transmit the payload. Data modulated using a low-bandwidth tone-map may be encoded and decoded with a lower PHY sampling rate, and may be reliably transmitted at lower amplitude, than can data modulated with a high-bandwidth tone-map. Assuming that the energy required to transmit a data symbol is proportional to the data encoding rate, the amount of energy it takes to transmit a data symbol may be expressed as:

$$E_{sym} = K_{sym} R, \qquad (2)$$

where R is the data encoding rate. On the other hand, data transmitted at lower data encoding rate will generally require more data symbols for transmission:

$$N_{sym} = ceil\left(\frac{8(L+8)}{R}\right). \qquad (3)$$

Expanding Equation (1) with the formulae for $E_{sym}$ and $N_{sym}$, the following formula is obtained for calculating the energy required to transmit a MPDU based on the frame length and data encoding rate:

$$E_{MPDU} = K_{sym} R \cdot ceil\left(\frac{8(L+8)}{R}\right) + K_{MPDU}. \qquad (4)$$

Figure 18:
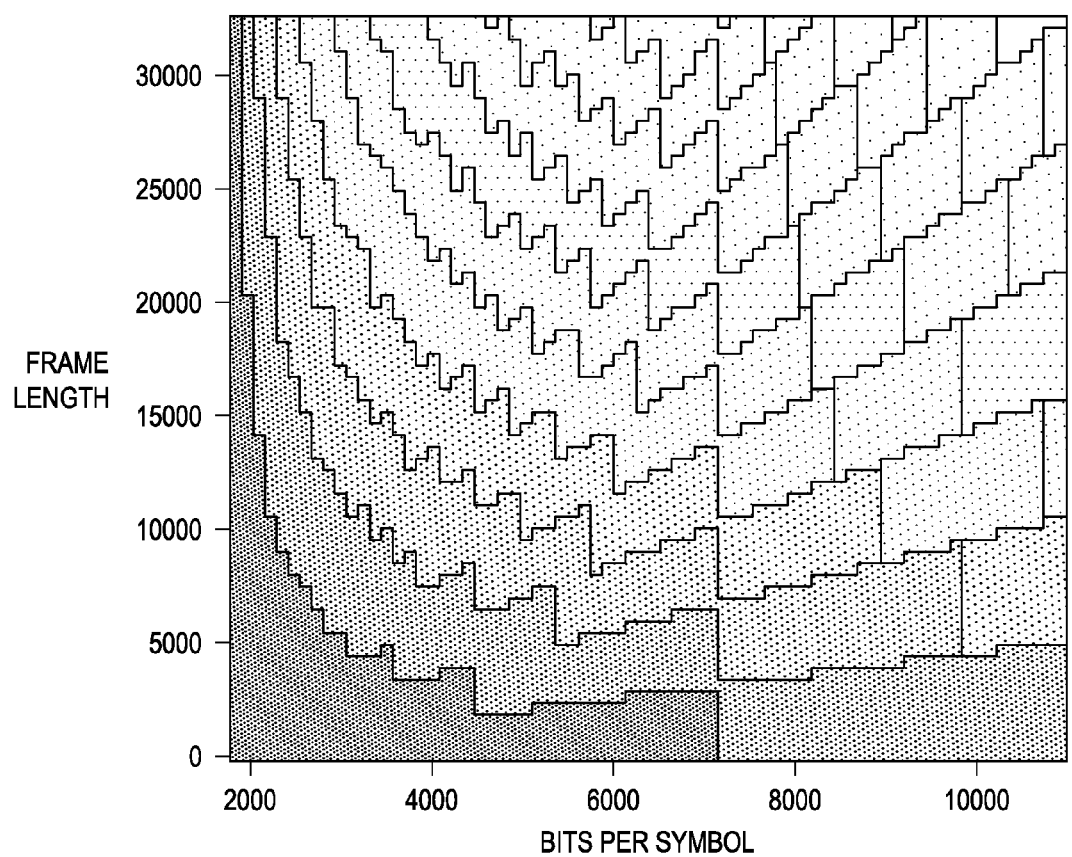
FIG. 18 illustrates a heat-map depicting the energy required to transmit a volume of data as a function of frame length and encoding rate.

FIG. 18 illustrates a heat map depicting the energy required to transmit a volume of data as a function of frame length and encoding rate. As can be seen, for any given frame length, the encoding rate may have a significant effect on the amount of energy it takes to transmit a frame, particularly at high data rates. While the nature of this relationship is dependent on the formula for $E_{sym}$, which will be transmitter-, receiver-, and (potentially) environment-dependent, it may be the case that, for some traffic volumes, energy may be saved by reducing the tone-map bandwidth.

This embodiment optimization may be supported by modifying the IEEE 1901 channel estimation process to generate and communicate a set of related tone-maps. In an embodiment, each tone-map in the set is optimized for maximum energy efficiency with a given volume of traffic—from high-volume/high-bandwidth encoding down to low-volume/low-energy. The payload receiver may take advantage of the fact that each tone-map in the set is derived from the same channel radio characteristics to efficiently encode the tone-map set for communication to the transmitter: the highest-capacity tone-map may use a current IEEE 1901 tone-map encoding mechanism, while lower-capacity tone-maps may be communicated as deltas from the next-higher capacity tone-map. When the tone-map set is synchronized between the transmitter and the receiver, the transmitter may select the optimal tone-map to use for sending payload across the medium, thereby saving power.

The above-described embodiment techniques may work better in TDMA regions than in CSMA regions. IEEE 1901 uses a CSMA/CA protocol to manage the shared medium, and CSMA/CA relies on all network nodes being able to detect when other nodes are communicating to avoid collisions. The above-described embodiment techniques may reduce the likelihood that uninvolved nodes will be able to reliably detect communications. In some embodiments, the above-mentioned techniques may be further refined to reduce the probability of collisions and the prospect of decreased network performance.

In an embodiment, the IEEE 1901 RTS/CTS protocol may be used to address this problem in CSMA regions. In one embodiment, during the RTS/CTS exchange, embodiment power reduction techniques are not employed: the RTS and CTS MPDUs are transmitted with standard transmit amplitude and with a full-length preamble. Since other stations should be able to receive the RTS and CTS MPDUs, the CSMA/CA algorithm may be much more robust in this embodiment. After a successful RTS/CTS, the payload MPDU transmission may use embodiment power reduction techniques related described above. In some embodiments, use of RTS/CTS means that there may be some additional communications overhead, increasing power consumption, increasing latency, and decreasing bandwidth. In some embodiments, a determination is made if the power savings in the payload communications will compensate for the expense of using the RTS/CTS protocol. This determination may be a part of the algorithm executed either by a single station or system wide collaboration where two or more nodes participate in the analysis.

Figure 19:
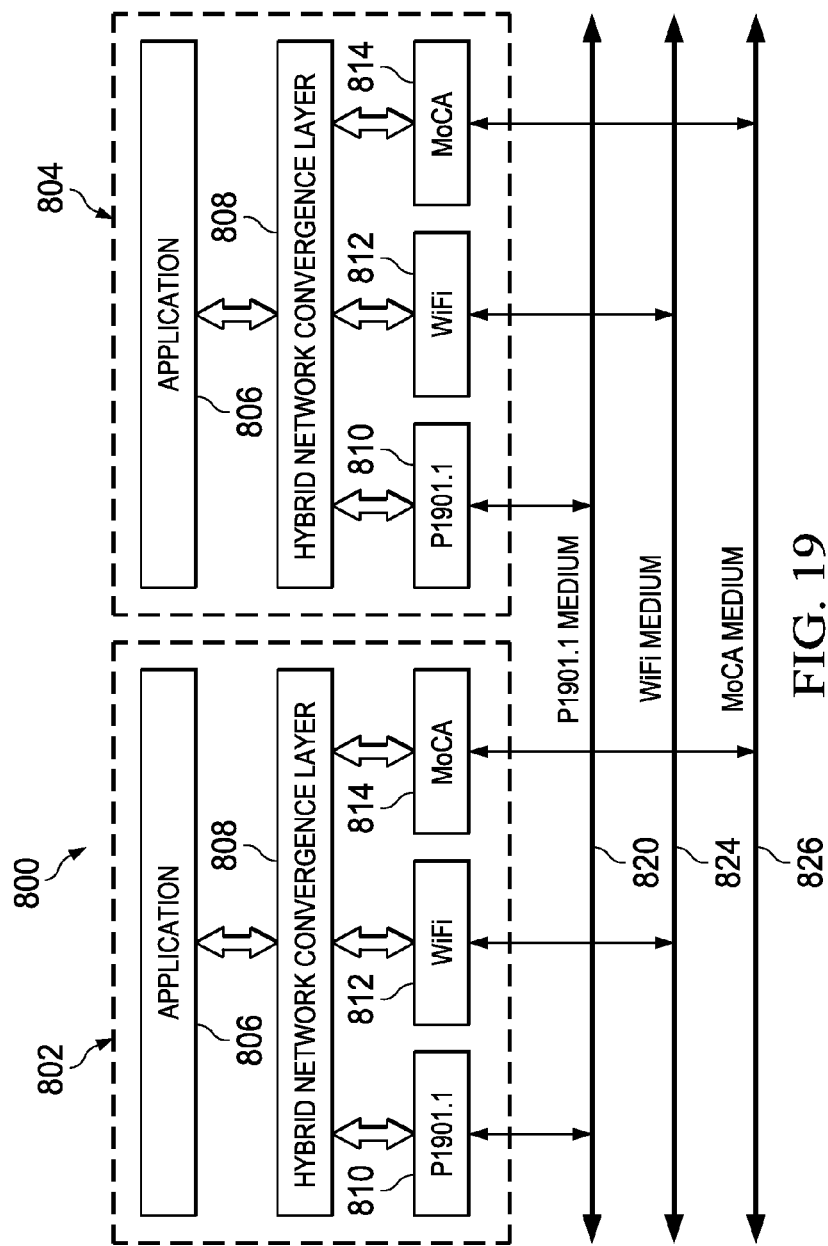
FIG. 19 illustrates an embodiment convergent network.

FIG. 19 illustrates convergent network 800 that may be defined as a network in which each node 802 and 804 may communicate using multiple MAC/PHYs 810, 812 and 814 coupled to different media 820, 824 and 826 simultaneously. In an embodiment, each node has application layer 806 and hybrid convergence layer 808. Each node also has a plurality of MAC/PHYs represented by IEEE 1901 interface 810 coupled to IEEE 1901 medium 820, Wi-Fi interface 812 coupled to Wi-Fi medium 824 and MoCA interface 814 coupled to MoCA medium 826. It should be understood that network 800 illustrated in FIG. 19 is one example of many possible embodiment networks. Alternative embodiment networks may include, for example, greater or fewer MAC/PHY interfaces utilizing the same or different network types.

The IEEE 1905.1 specification allows devices to communicate along multiple underlying technologies at once. For any given IEEE 1905.1 station, it is possible that some set of its underlying network interfaces are either unconnected (i.e. no other device can be reached using that interface) or redundant (i.e. no nodes can be reached using this network interface that can't also be reached using another). Unconnected network interfaces may be disabled to reduce power consumption. Such an interface may be enabled, however, when attempting to discover other devices that might be reachable only using that interface. Discovery time will be some fraction of the device's total uptime. Redundant interfaces can potentially be disabled, but this is a delicate operation that, implemented poorly, can prevent inter-device communications.

Figure 20:
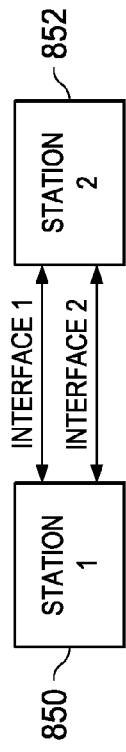
FIG. 20 illustrates the connection of two stations using multiple interfaces.

Disabling a redundant interface may reduce the available communications-path redundancy in the network. Safely disabling a redundant interface involves ensuring that neighbor nodes do not disable all alternative paths to reach the local node. For example, consider the network in FIG. 20, which depicts two stations connected by two interfaces. Both interfaces INTERFACE1 and INTERFACE2 are redundant, so both stations might choose to disable either interface. In this case, if station 1 disables INTERFACE1, while station 2 disables INTERFACE2, then the stations will no longer be able to communicate in some embodiments.

Figure 21:
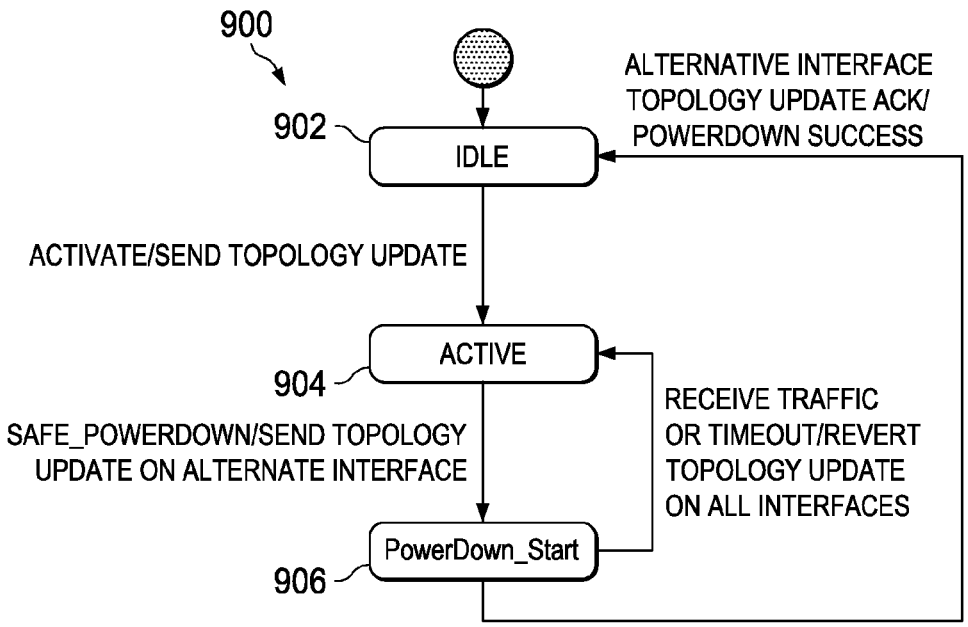
FIG. 21 illustrates an embodiment state machine.

FIG. 21 illustrates embodiment state machine 900 that implements a safe means of powering down a redundant interface. The state machine describes the enable/disable status of a network interface. Using this machine, disabling an active network interface involves sending a SAFE_POWERDOWN command to the control plane of the interface. The interface responds to this command by issuing a topology update to all remote devices in the network on alternative interfaces. If all remote devices acknowledge the topology update before a timeout expires, then it will be safe to shut down this interface. Otherwise, the operation will fail, and topology update messages are sent on all other interfaces to indicate that this network interface is still active.

In an embodiment, state machine 900 starts out in Idle state 902 and transitions to Active state 904 on receipt of an ACTIVATE command. At the receipt of a SAFE_POWER-DOWN command, state machine 900 transitions to Power-Down_Start state 906. If an acknowledgement is received from all remote devices, state machine 900 transitions back to Idle state 902. Otherwise, state machine 900 re-enters Active state 904.

In an embodiment, disabling a redundant interface may save energy on the device. However, some interfaces are likely to draw more power than others. Disabling these high-power interfaces will result in greater power savings. Disabling a redundant interface will also reduce a device's available communications capacity. In order to preserve QoS, such interfaces are re-enabled when more bandwidth is required for communicating to one of the stations reachable using that interface in some embodiments.

Streaming media applications are often characterized by communications of a large volume of media data, in which all media data is available for download immediately (limited by the bandwidth available between the media host and the rendering device), but where rendering occurs over time. In such applications, it will often be the case that a significant volume of data is available for rendering, well ahead of the time at which that data will be rendered. The large period of time between when the data enters the network and when the application requires it creates an opportunity to optimize network power consumption by manipulating transmission timing, and the transmission path. Optimizing the transmission path may use network-level information, and will be described below.

Depending on the environmental circumstances, it can take more or less energy to transmit the same volume of data across a network link. For example, if a user runs a microwave, this may interfere with Wi-Fi traffic, such that any attempt to communicate during this interval will require significantly more power to be successful. If a user runs a vacuum cleaner, this may interfere with IEEE 1901 traffic, meaning that communications will consume significantly more power for the same volume of data. An IEEE 1905.1 device may detect when there is a sudden decrease in communications efficiency, for example, by measuring the transmission success rate as determined by MAC-level acknowledgements. (As the success rate declines, so does communications efficiency.) An IEEE 1905.1 device may avoid transmissions while the medium is uncharacteristically inefficient, or until the user application requires the data. By using embodiment methods to avoid communications while communications operations are relatively inefficient, overall energy efficiency may be improved.

Convergent networks are characterized by the existence of multiple media connecting network stations (see FIG. 19). This implies that there will usually be multiple available communication paths between any two stations in the convergent network, and each such path will have an independent power consumption profile. Choosing the most power-efficient path requires information about the power efficiency of the paths under consideration.

The power consumed for communications depends on several factors, including: the power required keeping a network interface active; the power required to place a signal on the medium; and medium link quality. Each of these factors is itself a function of the underlying network interface technology, and of the physical network topology. As the IEEE 1905.1 network topology concept incorporates both the network interfaces available to a single device, as well as the available device-to-device links along those interfaces, the IEEE 1905.1 topology table is a natural place to store these power consumption data. To facilitate this, the IEEE 1905.1 topology query messages may be expanded, in an embodiment, to include information such as:

TABLE 1

Expanded IEEE 1905.1 topology query messages

| Category | Data | Interpretation |
| --- | --- | --- |
| Network Interface | Startup Cost | Power required to bring the network interface from a powered-off state to a powered-on state. |
| Network Interface | Shutdown Cost | Power required to bring the network interface from a powered-on state to a powered-off state. |
| Network Interface | Running Cost | Power required to keep the network interface available to send and receive traffic. |
| Network Interface and Destination | Transmit Cost | Power required to send a unit of data to this destination across this network interface. |
| Network Interface and Destination | Data Rate | The data rate this station would achieve sending data directly to this destination across this network interface. |

If any of this power-consumption information changes (e.g. due to a new interference source making transmissions to a destination more expensive), this may be considered a change in network topology, and may be communicated using the IEEE 1905.1 topology update mechanism in some embodiments.

In an embodiment, if the network topology table has been augmented with power consumption information, then this information may be used to determine the most power-efficient path to use for data communications. In this case, a weighted routing algorithm, such as Dijkstra's algorithm, may be used to traverse the topology table to find the most power-efficient path from the data ingress station to the data egress station that can support the required traffic load. Dijkstra's algorithm is described in EW Dijkstra, "A Note on Two Problems in Connexion with Graphs," Numerische Mathernatik, Vol. 1, pp. 269-271, 1959, which is incorporated herein by reference in its entirety.

In an embodiment, if the resulting path consists of a single hop, then the traffic may be directly sent to the destination. On the other hand, if the path consists of multiple hops, there are at least two available routing strategies: the origin may configure each station along the path with a routing rule, directing each node to forward data from this data stream along the subsequent edge in the communications path; or the origin may forward the data stream to the next station in the path, and the next station can use its topology table to determine the station it should forward the packet to along the same path. In some embodiments, the second mechanism may be more robust if there is a sudden change in network topology. This, however, may lead to routing loops if the local topology tables are not synchronized between the different nodes in the path.

Another embodiment approach to conserving power is to attack the problem from the other direction: instead of considering how to reduce power consumption while leaving other aspects of network performance unchanged, one may take power consumption as the constraint, and consider how to achieve maximum network performance while not allowing power consumption to exceed a user-specified envelope. In this case, embodiment techniques described herein may be applied with some modification, and may result in increasing available communications capacity without increasing power consumption.

In an embodiment, power is reduced by using two user-specified parameters: maximum power consumption, and time interval. Available power is reduced as it is needed for communications, and increased as time passes. If available power gets too low, communications techniques can become more conservative. In this way, communications will be possible, but performance will degrade as power consumption approaches the user-defined limit.

In a networking context, the term "Quality of Service" (QoS) is intended to capture all user-visible aspects of network performance. Commercial attempts to improve QoS have a strong tendency to focus on those aspects of QoS where users are the least satisfied—i.e. where the market demand is strongest. As networking technology becomes less expensive and more capable, many new types of networked applications may become economically viable. For some of these applications, high power consumption may significantly degrade the user experience, as when a smartphone's battery is drained too quickly, or when a tablet device or laptop becomes hot to the touch. Power consumption is becoming an increasingly relevant aspect of QoS in fast-growing market segments.

In some embodiments, applying any given technique individually may lead to some improved efficiency. In some cases, greater efficiency may be gained by applying multiple embodiment techniques at once. For example, automatically setting the receive gain during TDMA intervals will enable the transmitter to communicate using much shorter preambles than would be possible if the receiver had to spend time adjusting the gain—combining the TDMA fixed gain with the ability to shorten the transmitted preamble may yield better efficiency than would applying each technique in isolation.

In an embodiment CDHN, common setup procedures may be used for adding devices to a network, establishing secure links, implementing QoS, and managing the network. When a link goes down temporarily or is congested, an alternative route may be available to maintain data transmission. Furthermore, throughput may be aggregated and/or maximized via the multiple interfaces of a CDHN. These multiple interfaces may even allow for multiple simultaneous streams. With applications such as interactive TV, even a single person may be watching multiple streams simultaneously.

CDHNs such as IEEE 1905.1 may also support traffic load balancing in which, for example, intelligently distributed multiple video streams are intelligently distributed over different paths to limit congestion on any single media and maintain reliability. Quality of service (QoS) may also be supported via prioritization over multiple technologies. IEEE 1905.1 may also allow devices to be configured in the same manner, for example, with a simple button push. An IEEE 1905.1 hybrid network may also support advanced diagnostics in which the overall network monitors itself. Moreover, an IEEE 1905.1 hybrid network may also support mobility via wireless connectivity (mobile handsets, and tablets) and universal connectivity. For example, CDHN/IEEE 1905.1 may support a hybrid network in which one may connect to the hybrid network from every room in the house without having to be aware of which part of the network and what media their device is currently interfacing.

At the same time, the proliferation of User Generated Content (UGC), the shift to Over The Top (OTT) delivery, and the explosive growth in the number of nomadic and stationary content rendering points, has dramatically increased the importance of the networking layer to device function: users demand reliable, QoS-aware networking platforms. There are at least two complementary approaches to meeting this market need: one can work to improve the performance of a given network interface, such as a MAC/PHY; and one can attempt to leverage multiple types of media for link-level communications, as in IEEE 1905.1 hybrid networks.

Higher performance within a single network MAC/PHY may lead to increased power consumption. For example, communicating across a wider frequency band may need more signal energy on the medium; more advanced FEC techniques may need more complicated circuitry to implement the more complicated algorithms; and MIMO techniques may need multiple instances of certain parts of the PHY layer to run in parallel for a given transceiver operation. Each of these techniques may increase the power consumption of the system.

In an embodiment, metrics, such as energy and traffic metrics are used to determine lower energy ways to communicate from one device to at least one other device over at least one media type. Embodiments may apply intelligent means to proactively and dynamically adjust the parameters of the devices and selected communications networks in order to minimize the amount of energy used to communicate. In some embodiments, energy is reduced while the user's expected quality of service is maintained.

In one embodiment, for example, in a simple network, embodiments systems and method use information, for example, about the devices ability to manage power, the ability to reduce the transmission power to the minimum level necessary for a particular application, and knowledge about which protocols to use (e.g. with or without security, or retries).

In a multi-protocol and hybrid media network embodiment, embodiment power reduction techniques offers greater benefits because the network nodes may have the option of using multiple paths or multiple-contemporaneous paths to get the data delivered from one node to at least another node.

Embodiment systems may involve a single MAC/PHY implementation on a single device, a single MAC/PHY implementation on multiple devices across a whole network, a single device across multiple MAC/PHY interfaces coupled to different media types, and/or multiple devices across multiple MAC/PHY interfaces coupled to different media types across a whole network.

In an embodiment integrated network adapter, a best path though the network is dynamically selected based on the lowest power consumption of the available media types that can support the traffic. The determination of power consumption may include the dynamic reduction of a PHY output power based on a receiver's channel conditions based on quality parameters including AGC (Automatic Gain Control), SNR, and QoS (tolerance to losing packets). In embodiments of the present invention, the lowest power consumption may be a measure of an inclusive and/or total system power required to transmit and receive a certain amount of data meaningful for a specific application.

In an embodiment, unused media interfaces, functions or components are turned off or put into a power save mode to a reduction power when not selected for communications. An embodiment power save mode may include reduction in the frequency of CPU clocks, logic block clocks, and/or system clocks. In some embodiments, CPU power intensive functions such as compression are disabled or not used to save power when a traffic controller determines they are not necessary to meet the traffic requirements and channel conditions. Using lower orders of modulation also allows for the use of lower clock rates.

In an embodiment, different devices in the network that support the traffic requirements are selected based on each device's network power rating metric. This power rating metric may be assigned as a single or plurality of metrics and stored digitally in the device, and may be measured by a power measuring device that reports results to the device or is otherwise accessible by the network to make its metrics available to a hybrid network controller. In some embodiments, power is reduced by scheduling traffic in time or in packet sequence. Bursting, buffering, signal level, modulation methods and density, FEC techniques, and media access mechanisms may be selected to adjust power. Information based on queue statistics, traffic type, QoS requirements, application information, channel history, etc. may be used to determine selected network parameters that affect power consumption. In one embodiment, data is routed per data stream or per packet in response to the traffic type, channel conditions, network congestion. In another embodiment, the network protocol may increase or decrease the CSMA contention windows or Stayout region, (allocated time slots) to further reduce the energy required to use the network. Using such a method, the network controller may effectively reduce power consumption across every device in the network.

In an embodiment, multiple networks may be linked though a plurality of CDHN devices, where CDHN devices may perform either a simple packet forwarding or more sophisticated functions such as IP routing or even multi-protocol translation. Each link may be a "hop", wherein each device sends the source CDHN controller, the relevant power consumption data and the source CDHN controller (or another device/node tasked with such a decision making) decides which path and power management methods are appropriate to use, and routes traffic accordingly. Multiple networks may be linked though a plurality of CDHN devices, each link being a "hop", wherein each device can share relevant power consumption data (metrics) with devices on either side so it can decide, itself, which path and power management means are appropriate to use the minimum energy. In some embodiments, systems and methods described in U.S. Patent Publication No. 2005/0043858 entitled, "Atomic Self-Healing Architecture," which publication is incorporated herein by reference in its entirety, may be applied.

In an embodiment centralized approach, the controller is most likely to be associated with the central coordinator (CCo) like function in IEEE 1901. In this case, information related to the overall system bandwidth requirements is available to the controller to make such decisions. An embodiment decentralized approach would fit the networks if a central coordinating function does not exist or is not desirable. In this case, a networking node may monitor the network loading level and make decisions related to the transmit power reduction for a specific link based on the historical (recent or analyzed over extended periods of time) network loading, the trend of the network loading (increase or decrease in loading), and the loading of the local TX queues. In an embodiment, the algorithm provides for the constant network loading monitoring so in the case of the increased congestion the TX power may be raised to increase the link performance. In an embodiment, power consumption analysis is to be associated with the traffic type and either a node or the whole system can "learn" how to associate power consumption patterns with certain traffic types (VoIP, Video Streaming, bursty downloads, etc.) and apply power management schemas either stored in the memory of a device or a system, or develop the best suitable power management schema learning the traffic pattern and apply such schema next time when the same type of traffic is detected. Such a learning mechanism may also include the ability to improve itself with each operation cycle. For example, in one embodiment a hybrid network controller may associate power consumption patterns with traffic types, and apply a power management schema to the associated traffic type. The hybrid network controller may associate power consumption patterns by logging monitored traffic types and measured power consumption data corresponding to the monitored traffic types.

In an embodiment, network behavior is used as an input to a power and system management controller. By introducing power consumption metrics to a path selection algorithm, power consumption of the hybrid network may be reduced. This type of power consumption optimization by selecting various data paths, and by selecting various power down and power savings options, can be applied to a number of different types of networks.

For example, embodiments of the present invention may be applied toward a network based on a single media type and a hybrid network that is based on two or more media types. One example of a single media type network is an IEEE 1901 power line network, while an example of a multiple media network, is a network that includes IEEE 1901, IEEE 802.11x, and/or other network types as discussed above. In some embodiments, power consumption is predicted on a device level. This prediction may be based on the content of data queues, QoS parameters and network behavior. In some embodiments, historical metrics, for example, network usage statistics, may be used to determine and predict power consumption, and help determine appropriate path selection algorithms and power-down parameters. On the device level, historical information about how the device itself is used may also be considered.

With respect to single media type (single path) network, such as an IEEE 1901 network, device and system power consumption may be optimized by changing data scheduling, bursting buffering and other types of network behaviors. With respect to multipath hybrid networks, data path selection and device power parameters may be performed on both the device level, as stated above, and by changing data scheduling, bursting buffering and other types of network behaviors as in the case of the single path network.

Power consumption may be optimized for a particular data link and/or application. This optimization may be based on a QoS driven slot assignment or bandwidth reservation, using heartbeat techniques, or other methods. In some embodiments, these methods allow traffic to be scheduled so the times when the relevant interfaces and components need to be active are predictable. Heartbeat techniques may also be used to indicate which the parts of a system have gone to sleep or are not available. In one embodiment, for example, in the case of a multi-hop data connection, power per hop is also included as an input in the embodiment power optimization algorithms. Embodiment power optimizations algorithms may also determine how much power is reduced if different orders of modulation are used. Peripherals may also be disabled. For example, if an embodiment power optimization algorithm determines that one technology end point/network interface is sufficient to deliver a requisite amount of data at a requisite QoS, other interfaces and/or peripherals may be shut down and/or disabled in order to allow the hybrid network to operate at a lower power. In an embodiment, an interface between a physical layer and media access layer embodiment and a system to which they are attached allows the system to receive from PHY/MAC the information related to the "power cost" of the transmission and such other parameters as an example required time to "wake up" or transition from "STAND BY" to "IDLE" or "ACTIVE" states. This same interface may further allow for the system to configure power management option and/or patterns.

In one example of a preferred embodiment a system may be composed in such way that each media specific PHY/MAC is capable of providing a centralized controller with the information that contains power cost per unit of information transmitted and received, time required for the specific PHY/MAC to transition from "IDLE" to "ACTIVE" and furthermore from "Receive" to "Transmit" and vice versa. At the same time the centralized controller may be also responsible for the scheduling of the traffic. In this case the system may also select a mode of operation where a transmission of a video stream is done via Media A, while the receive operation associated with infrequent status updated information from the receiving node is done over Media B, additionally the PHY/MAC associated with Media B is transitioning from "IDLE" to "Receive" and back to "IDLE" based on the scheduled operation.

In some embodiments, the power consumption of the various components of the hybrid network system may be determined in the laboratory environment and power profiles are assigned based on the measured performance. In some embodiments, each network device may even assign themselves power metrics. When measuring the power in the lab, a live measurement may be performed near power distribution, in order to determine system level power consumption. In one embodiment, the power consumed by the system as measured at the energy supply is measured and compared with the energy consumption measured by the interfaces so that an accurate metric of system energy consumption required for each network is assessed. In some embodiments, queue, content, scheduling, types, volume, etc. are used to control power consumption. Combinations of power saving methods may also be used.

In an embodiment, depending on different amount of power used by hardware or the CPU, it may be determined whether to use burst operation (perform all the processes at once), continual operation (perform process but share time with other CPU or hardware processes), or whether to use functions that consume lots of CPU cycles such as compression.

In some embodiments of the present invention, transmit power may be based on the throughput requirements and available SNR. For example, if the link offers a high SNR that affords a very high throughput, but the only traffic that needs to be transmitted on this link is a relatively low bitrate audio, then shorter preambles and/or lower transmit power may be used in order to reduce power consumption while providing the required throughput. Feedback mechanisms may also be used. Furthermore, transmit power may be reduced based on QoS requirements and overall network loading to avoid artificially created network congestion as an example.

In one embodiment, a channel estimation process may be extended to include a function that negotiates not only the source (transmitter) transmit power, but also the receiver's transmit and response power level if the protocol requires the receiver to provide acknowledgments or any other type of response to the transmitter. For example, a transmitted power field may be added to a channel estimation request. In the intermediate channel estimation responses, the receiver may indicate how the transmitter should modify the transmit power level. For example, the receiver may request a particular increase in transmit power. In some embodiments it is ensured that the receiver can hear the transmitter channel estimation request. In some embodiments, ready to send/clear to send (RTS/CTS) frame controls may be used at maximum transmit power during negotiation. Such an embodiment example may be used to determine back-channel signal amplitude for responses. In some embodiments, the controller or receiving devices extrapolates tone maps that would be optimized for maximum energy efficiency for a given volume of traffic, for example from high traffic volume/high bandwidth to low traffic volume/low bandwidth. Using sets of maps for specific levels of performance reduces the energy required to transmit multiple dynamic tone maps.

In an embodiment, an optimum transmitter power is computed based on the channel estimation responses without burdening the receiver with the need to provide additional information. This technique may be applied, for example, in cases where an embodiment system is operating on a network that is comprised in part of older devices not equipped with this functionality.

In some embodiments, power optimization may be performed on the aggregate signal level or on each carrier (in the multi-carrier or OFDM system) individually. In the case of the per-carrier adjustment, well performing carriers may be used while shutting down carriers with poor performance. It is likely that carriers exhibiting low performance would be associated with the lower impedance of the network as seen by transmitter. This may help with the additional reduction of power while improving the linearity of the transmit path drivers/amplifiers. In some embodiments, systems and method described in U.S. Patent Publication No. 2003/0071721 entitled, "Adaptive Radiated Emission Control", which publication is incorporated herein by reference in its entirety, may be applied.

In one embodiment, the transmitting node may be the same method to perform the channel estimation, but after the computation of the tone map was accomplished at the full TX power, a new request is generated after the TX power is adjusted by the TX node to maintain enough SNR (overall or per carrier) to provide sufficient throughput.

In one embodiment, early preamble symbols may be detected at a divided clock rate in order to save power. In some embodiments, these preamble symbols may not need phase measurements or precise demarcation.

In an embodiment, the network device or interface may use energy from a more energy efficient source. For example, AC power may be taken from a PLC network interface connected to AC mains or a DC circuit. Ethernet networks may be carrying DC power over Ethernet and be more efficient or convenient for devices to use, especially if power to a device is cut off.

In some embodiments, the power may be accumulated from received transmissions. For example, some of the transmit energy may be harvested from the received signal for use in subsequent transmissions, or from a power supply at the lower current. Furthermore, a software level understanding of the network state may be used to enable or disable portions of the network hardware. One embodiment approach is harvesting the energy from the receive signal to perform "wake on LAN" functions at significantly reduced power consumption while other components of the system including the AC/DC or DC/DC power supplies are either in standby or power down mode.

In some embodiments, the frequency ranges used for transmissions may be managed with respect to transmissions different destinations based on parameters such as the SNR. For example, communications may be performed using fewer IEEE 1901-based carriers. Alternatively, the number of transmit carriers may be reduced in other systems in order to save power. In some embodiments, transmissions may be looped back to the source, thereby allowing the source to measure the energy it's actually outputting on different portions of the transmit spectrum. In some embodiments, this loop back transmission scheme is performed using an attenuator. The information obtained from loopback transmissions may be given to data recipients, such that actual signal degradation along different frequencies may be measured rather than inferring the level of signal degradation based on an assumption of a perfect transmitter. In one embodiment the system or a node may learn how to transmit in fewer carriers that are grouped in a contiguous frequency band and reduce clocking speed requirements for the transmitting and receiving nodes operating in this mode.

In some embodiments, aspect oriented programming (AOP) may be used in the software code that controls the hybrid network adapter in order to centralize power management decisions while making sure that there is no interference with the composition of the rest of the system. In an embodiment, using a message passing software architecture, power management code may be allowed to intercept messages between different components of the system. The power management code then maintains an internal model of how the system will behave. This internal model may be used to enable, disable, and adjust voltages, clocks, and other parameters of different hardware components according to whether the hardware components are required according to the particular power consumption state of the system and/or operational decisions made by such management code. In some embodiments, the hybrid adapter has the ability to learn the network topology along its associated power consumption.

In some embodiments, a determination is made on whether to use per flow or per packet routing. For example, in a network with plenty of bandwidth available, per packet routing may be selected when congestion is encountered. In some embodiments, per flow routing may be less computationally intensive then per packet routing. In some embodiments, throttle clocks may be used to minimize power consumption.

In some embodiments, power may be controlled by enabling or disabling particular underlying interfaces within the network adapter system, depending on bandwidth requirements and device coverage. For example, if there are only two devices that may connect over a particular network, for example a Wi-Fi device or a MoCA device, the lowest power connection for the communications may be the only one used until it can no longer meet its bandwidth requirements.

In one embodiment, a hybrid network may have a device for discovering how much marginal power would be dissipated by establishing a traffic pattern along a network path, and by transmitting a given traffic pattern along the path. For example, the power dissipated by establishing the traffic pattern would be the power dissipated by the power takes to enable particular network interfaces. In one example, a path proceeds from an IEEE 1901 device interface (STA1), to an IEEE 1901 interface in a second device (STA2), to an Ethernet device in the second device (STA2 ETH), to an Ethernet interface in a third device (STA ETH) to the third device (STA3). This particular path or setup sequence may be represented as: STA1 IEEE 1901→STA2 IEEE 1901→STA2 ETH→STA3 Eth→STA3. It should be understood that this particular path is just one specific embodiment example of a particular path, as other embodiment paths using other combinations of devices and interface types may be implemented. In some embodiments, clock scaling may be managed based on knowledge related to traffic requirements and bandwidth reservation and scheduling. In some embodiments, the power dissipated by the setup sequence may be determined using various combinations of paths and patterns, measuring the power consumption changed by the network, and reporting this power consumption change back to the controller.

In accordance with an embodiment, a network device includes a first data interface, a hybrid network controller coupled to the first data interface, and a plurality of network interfaces coupled to the hybrid network controller. The plurality of network interfaces include at least one media access control (MAC) device configured to be coupled to a plurality of physical layer interfaces (PHYs). The hybrid network controller is configured to determine a network path comprising at least one of the plurality of network interfaces that has a lowest power consumption of available media types coupled to the plurality of PHYs, and determine over which of the plurality of network interfaces the first data interface sends data to and receives data from, based on the determined network path. The network path may be dynamically determined during operation of the hybrid network controller, and/or the network path may be dynamically determined on a per packet basis or on a per packet segment basis.

In an embodiment, an interface between a physical layer and a media access layer is configured to receive a power cost metric of a transmission from the MAC device or from one of the plurality of PHYs. The hybrid network controller may be further configured to reduce an output power of at least one PHY based on channel conditions seen by at least one of the plurality of network interfaces. The controller may reduce an output power of the at least one PHY by reducing a number of transmitted carriers grouped in a contiguous frequency band in a reduced carrier mode and/or by reducing clocking speed requirements for transmitting and receiving node when operating in the reduced carrier mode.

The hybrid network controller may be further configured to determine a lowest power consumption of available media types based on parameters including automatic gain control (AGC) setting, signal to noise ratio (SNR) of the available media types, and quality of service (QoS) parameters of transmitted data. In some cases, the QoS parameters comprise a priority parameter. The hybrid network controller may also be further configured to reduce an output power of a network interface of the plurality of network interfaces by powering down the network interface or placing the network interface in a power saving mode when the network interface is not selected for communication. In some embodiments, the hybrid network controller is configured to place the network interface in the power saving mode by reducing a frequency of a CPU clock or a system clock.

The hybrid network controller may be configured to reduce a power of the PHY or the MAC by disabling data compression and encryption when a traffic controller determines that data compression and encryption are not necessary based on traffic requirements channel conditions. In some embodiments, the hybrid network controller may include the traffic controller.

In an embodiment, the hybrid network controller determines the network path based on a power rating metric of the network device. The power rating metric of the network device may be digitally stored on the device as a single power rating metric or as a plurality of power rating metrics. The network device may further include a power measuring sub-system configured to measure the power rating metric and report the power rating metric to hybrid network controller. The power measuring device may be further configured to make the power rating metric available to a traffic controller and to a network coupled to the network device.

In an embodiment, the hybrid network controller is further configured to reduce power consumption of the network device by scheduling traffic in time on in a packet sequence using bursting, buffering, modulation complexity, preamble methods, or using information based on queue statistics, traffic type, application information or channel history. The hybrid network controller may be further configured to route data per data stream or per packet in response to a traffic type, channel conditions, and a measure of traffic congestion.

In an embodiment, the hybrid network controller is further configured to associate power consumption patterns with traffic types. For example, the hybrid network controller may be further configured to apply a power management schema to the associated traffic type. The hybrid network controller may further associate power consumption patterns by logging monitored traffic types and measured power consumption data corresponding to the monitored traffic types.

In accordance with a further embodiment, a network device includes a network controller and at least one network interface coupled to the network controller that includes at least one media access control (MAC) device configured to be coupled to at least one physical layer interface (PHY). The network controller may be configured to determine a network path comprising the at least one network interface that has a lowest power consumption of available media types coupled to the at least one PHY. In some embodiments, the network controller may be a hybrid network controller.

In some embodiments, the network controller is further configured to determine the network path by receiving power consumption data from further network devices, selecting a plurality of the further network devices based on the received power consumption data, and routing data on the selected plurality of further network devices. The network controller may be further configured to determine a data path of the selected plurality of further network devices, and determine path and power management methods for at least one of the selected plurality of further network devices.

In some embodiments, the network controller is further configured to transmit power consumption data to a first further network device, receive a data path assignment from the further network device based on the transmitted power consumption data, and relay data from the further network device to a second further network device based on the path assignment. The network controller may also be configured to receive a requested path and power management method from the first further network device, and relay the data from the further network device to the second further network device based further on the received path and power management method.

In some embodiments, the network controller is configured to determine a power management method, and relay the data from the further network device to the second further network device based further on the determined path and power management method.

In accordance with a further embodiment, method of operating a network device includes determining a network path comprising at least one of a plurality of network interfaces that has a lowest power consumption of available media types, and determining over which of the plurality of network interfaces the first data interface sends data to and receives data from, based on the determined network path. Determining the network path may be dynamically performed during operation of the network device.

In some embodiments, the method also includes reducing an output power of at least one physical layer interface (PHY) based on channel conditions seen by at least one of the plurality of network interfaces. The method may also include determining a lowest power consumption of available media types based on parameters including automatic gain control (AGC) setting, signal to noise ratio (SNR) of the available media types, and quality of service (QoS) parameters of the available media types.

In an embodiment, the method further includes reducing an output power of a network interface of the plurality of network interfaces, reducing comprising by powering down the network interface or placing the network interface in a power saving mode when the network interface is not selected for communication. Placing the network interface in the power saving mode may include reducing a frequency of a CPU clock or a system clock.

In an embodiment, the method further includes determining that data compression and encryption are not necessary based on traffic requirements channel conditions, and reducing a power consumed by the network device by disabling data compression based on determining that data compression and encryption are not necessary. The method may further include determining that data compression and encryption may be relaxed based on traffic requirements channel conditions, and reducing a power consumed by the network device by reducing a complexity of forward error correction (FEC) disabling data compression based on determining that data compression and encryption may be relaxed.

In an embodiment, the method may further include determining a power rating metric of the network device, wherein determining the network path is performed based on the determined power rating metric. Determining the power rating metric may include performing a power measurement, and the power metric rating may be defined as a power consumed per unit of transmitted or received information. The method may further include reporting the power rating metric to a further network device coupled to the network device.

In an embodiment, the method further includes reducing power consumption of the network device by scheduling traffic in time on in a packet sequence, using bursting, buffering, modulation complexity, preamble methods, or using information based on queue statistics, traffic type, application information or channel history. The method may also include routing data per data stream or per packet in response to a traffic type, channel conditions, and a measure of traffic congestion.

In accordance with a further embodiment, a network device includes a hybrid network controller, and a plurality of network interfaces coupled to the hybrid network controller. Each of the plurality of network interfaces may be configured to be coupled to a corresponding physical layer interface (PHY). The network device also includes a processing engine configured to perform MAC functions common to the plurality of network interfaces. The hybrid network controller may be further configured to determine a network path comprising at least one network interface that has a lowest power consumption of available media types coupled to the plurality of PHYs. In some embodiments, the MAC functions comprise queuing functions for the plurality of network interfaces.

In accordance with a further embodiment, a network device includes a plurality of network interfaces coupled to a hybrid network controller. Each of the plurality of network interfaces may be configured to be coupled to a corresponding physical media via a corresponding physical layer interface (PHY). The network device also includes a processing engine configured to perform MAC functions common to the plurality of network interfaces and a hybrid network controller function. The hybrid network controller may be configured to determine a network path that includes at least one network interface of the plurality of network interfaces having parameters that decrease power consumption. In some embodiments, the hybrid network controller is further configured to determine a network path that meets a Quality of Service (QoS) requirement. In some embodiments, the hybrid network controller is configured to determine a network path comprising at least one network interface of the plurality of network interfaces having the parameters that best meet Quality of Service and power consumption requirements. As with other embodiments, MAC functions may include queuing functions for the plurality of network interfaces and a network convergence layer.

In some embodiments, or in combination of the previously explained embodiments, security or link security attributes may also be used to determine the lowest possible energy consumption path and/or a lowest possible energy consumption path that meets a security level, i.e., a minimum set of security requirements or attributes. In embodiments, "security" may include methods and systems that protect confidentiality of the data, authentication and access control. Security levels are often determined by the user or the application. For example, a user may set email to be sent over a secured link or establish a virtual private network (VPN) in order to access data on a secure network.

Security attributes may be set by the user, the system administrators, the system itself or even as a result of choosing a function such as secure email. For example, in some embodiments, security attributes may include whether or not the system uses an authentication protocol (e.g., challenge-handshake authentication protocol, password authentication protocol, digest access authentication, Extensible Authentication Protocol (EAP), etc.), and whether this authentication protocol supports security association schemes, such as robust secure network association (RSNA), device-based security network association (DSNA) or pairwise security association (PSA) Security attributes may also include whether authentication or pairing is "automated" or whether such authentication needs an operator to push a button. Attributes may also include in which OSI layer(s) security is (are) provided. For example, such OSI layer attributes may include whether the link supports transport layer security (TLS) or whether link-layer or application-layer security must be used. Attributes may also include, for example, whether the system supports standard security exchange formats such as OpenPGP or X.509, which encryption algorithm is used (e.g. Camellia, DES, AES-modes CCMP, CBC, etc.), what type of encryption initialization vector (IV) or nonce is used (e.g., concatenated IV, IV mixed with secret root key, etc.). Further embodiment attributes include whether the system supports public key infrastructure (PKI) or private key exchanges for exchanging, for example, network membership keys (NMKs), pairwise point to point encryption keys (PPEKs), or other traffic encryption keys (TEKs), and what if any type of asymmetric key exchange method is used (e.g., RSA using password-authenticated key exchange, Diffie-Helman, Elliptic Curve Diffie-Helman (ECDH), etc.). Embodiment attributes may also include the bit width of each encryption block (e.g., 128-bit blocks for AES-256), the key length in bits (e.g., 256 bits for AES-256), how the data integrity is checked (e.g., integrity check values (ICV)), and which hash functions are supported (e.g., SHA1, SHA-256). It should be appreciated that these security attributes are just a few examples of many possible embodiment attributes. In alternative embodiments, other attributes may be used.

In various embodiments, the link may be selected as long as the minimum security meets the system requirements and is compatible with the rest of the system or can be converted and repackaged to satisfy the requirements for other links in the system. Simpler security methods such as encryption using 128-bit key lengths (e.g., AES-128) as compared to 256-bit encryption (e.g., AES-256), or systems that are pre-keyed and do not need public-key management functions (e.g., EAP-Pre-Shared Key (EAP-PSK)) may require less energy to implement and may be faster to process. In addition, using the same type of security from end-to-end of the link may prevent the need to convert frames between security systems, for example, doubling the energy expenditure for decrypting and re-encrypting the data to put it into the correct format for a specific link requirement. Using the minimum methods and security attributes to augment the link selection process may reduce overall communications, link and system power consumption. For example, in some embodiments links that do not support the minimum required security would not be selected regardless of their energy efficiency and could reduce power consumption when not used.

Figure 22:
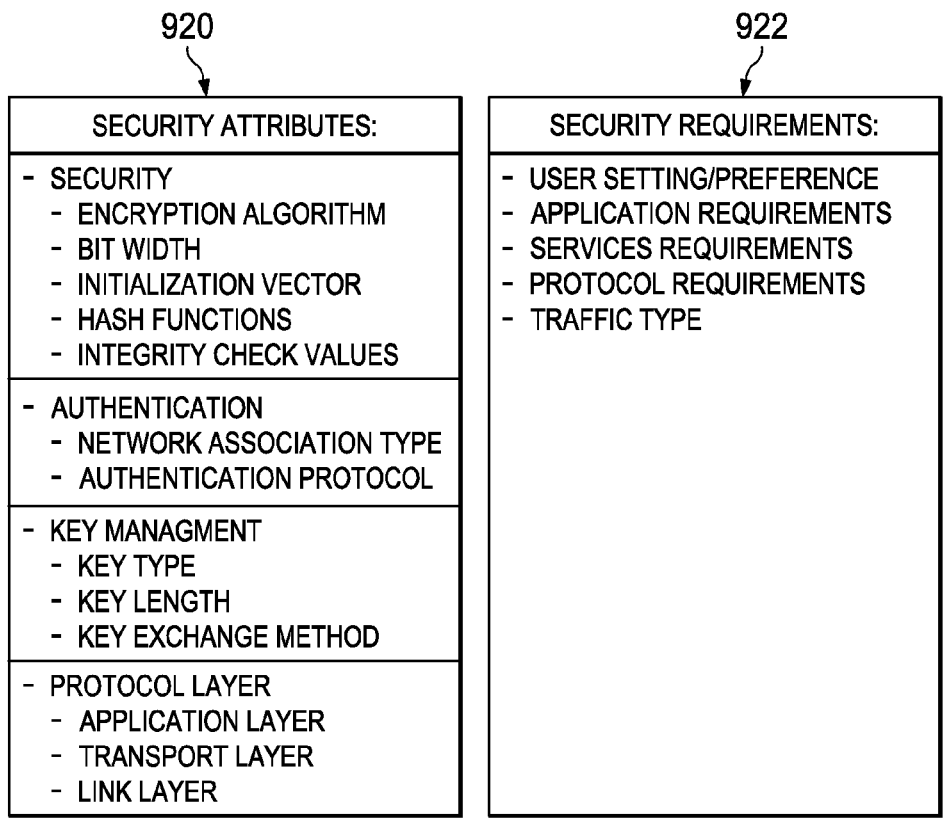
FIG. 22 illustrates tables describing example embodiment security attributes and security requirements.

FIG. 22 illustrates tables 920 and 922 that denote embodiment security attributes and items from which security requirements (e.g., a minimum set of security attributes) may be derived for an example embodiment. As shown in table 920, security attributes include attributes directed toward security, authentication, key management and protocol layer. Security related security attributes include the encryption algorithm, bit width, initialization vector type, hash functions and integrity check values that are used. Authentication related security attributes include the authentication protocol and the network association type that is supported by the authentication protocol, and key management related security attributes include the key type, key length and key exchange method that are used. Protocol related security attributes include whether other security attributes are applied at the application layer, transport layer and/or link layer.

In an embodiment, a minimum set of security attributes may be derived and/or determined based on security requirements denoted in table 922. For example, minimum security attributes may be determined based on user settings and preferences, application requirements, services requirements (e.g. authentication, integrity, confidentiality), protocol requirements and traffic type. For example, a user setting may define a minimum key length and/or key type. From this user setting a minimum security attribute and/or minimum set of security attributes may be derived. As a second example, a home banking application may define Diffie-Helman as a minimum key exchange method, so that use of either Diffie-Helman or Elliptic Curve Diffie-Helman would meet minimum security attributes. As a third example, network traffic content such as copyrighted video, confidential financial data, or other proprietary network traffic type may also be used to determine minimum security requirements for encryption algorithm, key length, etc. As a fourth example, a protocol setting may specify that a device should communicate using a protocol such as IEEE 1901 that requires the use of link-level AES-128 encryption. It should be understood that the security attributes and requirements shown in FIG. 22 are just one embodiment set of attributes and requirements directed toward a specific embodiment. In alternative embodiments, different attribute sets and requirements may be used.

In one example embodiment, a first network device may have an option to communicate with further network device using a variety of communications links. As specified in standards such as IEEE 1901, an initial step to determine which link is the most energy efficient may be to probe the further station's security capabilities by monitoring beacon frames (e.g., using the extended information block (EIB)) or through active probing using messages to determine what security is supported by the further device. If the user owns both the originating and receiving devices and the file to be sent over a short range (e.g., both devices are in the room) it may be sufficient to simultaneously press buttons on each device to authenticate the devices to each other to establish a common key or private link. Both Wi-Fi quick connect and Bluetooth pairing are examples of the foregoing. If the first device is sending a file that is considered private (such as a "selfie") but not important (unlike, for example, banking information), transmitting the file without encryption may meet a minimum security requirement. However, if banking information were to be sent, the minimum security requirement may be to send the file with AES-128 encryption with SHA-256-based integrity verification.

In an embodiment, the first network device determines the appropriate minimum requirements by considering the user settings, applications, content to be transmitted and related data. If the further device is probed and is capable of SHA-256 hash function and AES-128 encryption, which are not needed for this transmission, those functions may be turned off to save energy. If, for example, an alternative low energy link never had these capabilities, it could be considered along with the other possible links. If, on the other hand, the data is banking information which the application requires to be sent using SHA-256 hash codes and AES-128 encryption, and the link has to transverse public infrastructure over long distances thereby requiring methods to exchange and manage the network/encryption key, the first device probes to determine which link can support this new set of minimum security requirement attributes. Other possible communications links that do not support these requirements can be turned off. If no links are available, the first device can inform the user about the available security services, wait until the services are available or terminate the initialization session. It should be appreciated that the specific examples of security attributes and the determination of minimum security requirements are a few examples of many possible embodiment attributes and requirements. Alternatively, other security attributes and minimum requirements may be used depending on the particular system and its specifications.

In embodiments where the further device routes the payload data to a second further device, the link selected to communicate to the second further device may be in an independent security domain, i.e., a domain that is not accessible by the first device. Accordingly, the security attributes may be selected in the same way as in the first link. If the same security attributes are used in the link between the further device and the second further device, the energy required to decode the data from the first link and encode it for the second link may be avoided, and may be factored into the lowest energy link selection.

Figure 23:
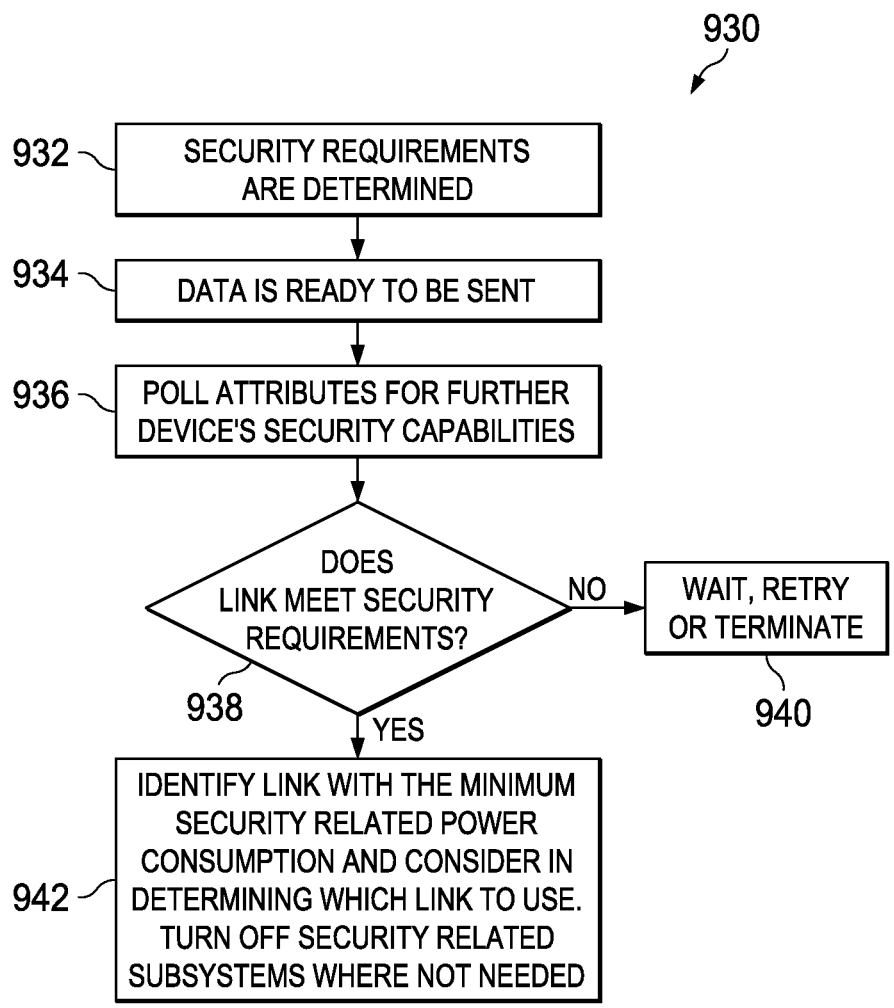
FIG. 23 illustrates a flowchart of an embodiment security method.

FIG. 23 illustrates a flowchart of an embodiment security method 930 that may be performed by an embodiment network controller. As shown, in step 932, security requirements are determined. These security requirements may include, for example, a minimum set of security attributes that are determined, for example, according to the security requirement table 922 and applied to attributes described in table 920 in FIG. 22. After data is ready to be sent in step 934, the network controller polls security capabilities of candidate further devices to which data may be sent. These security capabilities may include security attributes similar to those listed in table 920. In step 938, the network controller compares the security attributes of candidate further devices to security requirements, such as minimum security attributes. If no link to a candidate further device can be established that meets these requirements, then the operation is delayed, retried and/or terminated in step 940. If, on the other hand, the security requirements are met by one or more candidate further devices, a link with a minimum security related power consumption (that still meets the minimum security requirements) is considered and/or selected for use. If particular security related subsystems are not needed to meet minimum security requirements, such security related subsystems may be disabled in some embodiments. It should be understood that method 930 described in FIG. 23 is just one of many possible embodiment security methods.

In some embodiments, a message/data may require a first security level, but the acknowledgement message/data for the first message may require a second security level, the second security level being different than the first security level. For example, an email may be sent over a high security channel, such as secure Wi-Fi, but the acknowledgement message to the email may be sent over a lower power requirement and lower security channel, such as Bluetooth. In this example, the hybrid network controller may determine that the email requires high security and decides to use a secure channel that is not the lowest power consumption channel, but then determines that the security requirements for the acknowledgement message are not as high, and sends the acknowledgment message over a lower power consumption and lower security channel.

Advantages of embodiment systems include the ability to reduce energy, cost of ownership and improve the system design by using embodiment systems, methods and combinations of systems and method described herein to optimize energy consumption.

Another advantage of embodiment systems includes the ability to improve power efficiency while maintaining traditional QoS metrics. Further advantages include, the ability to reduce the range in which it is practical to eavesdrop on a communications link, the ability to decrease interference between radio networks; and the ability to decrease the demand placed on the power distribution infrastructure.

The following U.S. Patent Application Publications and U.S. Patents are incorporated herein by reference in their entirety: U.S. Patent Publication No. 2003/0071721, entitled "Adaptive radiated emission control;" U.S. Patent Publication No. 2005/0043858, entitled "Atomic self-healing architecture;" U.S. Patent Publication No. 2008/0205534, entitled "Method and system of channel analysis and carrier selection in OFDM and multi-carrier systems"; U.S. Pat. No. 6,891,796, entitled, "Transmitting data in a power line network using link quality assessment"; U.S. Pat. No. 6,917,888, entitled, "Method and system for power line network fault detection and quality monitoring"; U.S. Pat. No. 7,106,177, entitled, "Method and system for modifying modulation of power line communications signals for maximizing data throughput rate"; U.S. Pat. No. 7,193,506, entitled, "Method and system for maximizing data throughput rate in a power line communications system by modifying payload symbol length"; U.S. Pat. No. 7,245,625, entitled, "Network-to-network adaptor for power line communications"; and U.S. Pat. No. 7,286,812, entitled, "Coupling between power line and customer in power line communication system". Systems and methods described in the above mentioned U.S. Patents and U.S. Patent Applications can be applied to embodiments described herein.

The following standards document is incorporated by reference herein in its entirety: IEEE Std 1901-2010™-IEEE Standard for Broadband over Power Line Networks: Medium Access Control and Physical Layer Specifications, New York, N.Y.: IEEE; IEEE Std 1905.1-2013, IEEE Standard for a Convergent Digital Home Network for Heterogeneous Technologies, New York, N.Y.: IEEE; and IEEE Std 1905.1-2014, IEEE Standard for a Convergent Digital Home Network for Heterogeneous Technologies, Amendment 1: Support of New MAC/PHYs and Enhancements. New York, N.Y.: IEEE.

It will also be readily understood by those skilled in the art that materials and methods may be varied while remaining within the scope of the present invention. It is also appreciated that the present invention provides many applicable inventive concepts other than the specific contexts used to illustrate embodiments. Accordingly, the appended claims are intended to include within their scope such processes, machines, manufacture, compositions of matter, means, methods, or steps.

What is claimed is:

1. A network device comprising:
a network controller; and
at least one network interface coupled to the network controller, the at least one network interface comprising at least one media access control (MAC) device configured to be coupled to at least one physical layer interface (PHY), wherein:
the network controller is configured to
determine a network path comprising at least one network interface that has a lowest power consumption of available media types coupled to the at least one PHY and meets a minimum set of security attributes, and
transmit power consumption and security data to a first further network device, wherein the power consumption data comprises measurements of power consumed by the network device.

2. The network device of claim 1, wherein the minimum set of security attributes includes at least one of an encryption algorithm, a key exchange method, and a key length.

3. The network device of claim 1, wherein the network controller is further configured to determine the minimum set of security attributes, wherein the minimum set of security attributes is determined based on at least one of a user setting, an application requirement, a service requirement, a protocol requirement, and a traffic type.

4. The network device of claim 1, wherein the network controller is further configured to determine the network path by receiving power consumption and security data from further network devices, selecting a plurality of the further network devices based on the received power consumption data, and routing data on the selected plurality of further network devices.

5. The network device of claim 4, wherein the network controller is further configured to determine a data path of the selected plurality of further network devices, and determine path, power management methods and security methods for at least one of the selected plurality of further network devices.

6. The network device of claim 1, wherein the network controller is further configured to receive a data path assignment from the first further network device based on the transmitted power consumption and security data, and relay data from the first further network device to a second further network device based on the path assignment.

7. The network device of claim 6, wherein the network controller is configured to receive a requested path, security method and power management method from the first further network device, and relay the data from the first further network device to the second further network device based further on the received path, security method and power management method.

8. The network device of claim 6, wherein the network controller is configured to determine a power management and security method, and relay the data from the first further network device to the second further network device based further on the determined path, security method and power management method.

9. The network device of claim 1, wherein the network controller is further configured to determine the network path having a lowest power consumption of security measures that meet the minimum set of security attributes.

10. A network device comprising:
a first data interface;
a hybrid network controller coupled to the first data interface; and
a plurality of network interfaces coupled to the hybrid network controller, the plurality of network interfaces comprising at least one media access control (MAC) device configured to be coupled to a plurality of physical layer interfaces (PHYs), wherein
the hybrid network controller is configured to
determine a network path comprising at least one of the plurality of network interfaces that has a lowest power consumption of available media types coupled to the plurality of PHYs, and meets a minimum set of security attributes,
determine over which of the plurality of network interfaces the first data interface sends data to and receives data from, based on the determined network path,
transmit power consumption and security data to a first further network device,
receive a data path assignment from the first further network device based on the transmitted power consumption and security data, and
relay data from the first further network device to a second further network device based on the path assignment.

11. The network device of claim 10, wherein:
the minimum set of security attributes includes at least one of an encryption algorithm, a key exchange method, and a key length; and
the hybrid network controller is further configured to determine the minimum set of security attributes, wherein the minimum set of security attributes is determined based on at least one of a user setting, an application requirement, a service requirement, a protocol requirement and a traffic type.

12. The network device of claim 10, wherein:
an interface between a physical layer and a media access layer is configured to receive a power cost metric of a transmission, and security attributes from the MAC device or from one of the plurality of PHYs, wherein the power cost metric of the transmission includes a power cost of security attributes.

13. The network device of claim 10, wherein the hybrid network controller is configured to reduce a power of the PHY or the MAC by disabling data compression and encryption when a traffic controller determines that data compression and encryption are not necessary based on traffic requirements channel conditions and link security requirements.

14. The network device of claim 10, wherein the hybrid network controller determines the network path based on a power rating metric and security attributes of the network device.

15. The network device of claim 14, further comprising a power/security measuring sub-system configured to:
measure the power rating metric;
determine the minimum security attributes; and
report the power rating metric and the minimum security attributes to the hybrid network controller.

16. The network device of claim 15, wherein the power measuring device is further configured to make the power rating metric and security data available to a traffic controller and to a network coupled to the network device.

17. A method of operating a network device comprising a first data interface and a plurality of network interfaces, the method comprising:
determining a network path comprising at least one of the plurality of network interfaces that has a lowest power consumption of available media types, and has minimum security attributes, wherein the determining the network path comprises using a hardware-based controller;
determining over which of the plurality of network interfaces the first data interface sends data to and receives data from, based on the determined network path, wherein the determining over which of the plurality of network interfaces the first data interface sends data to and receives data from comprises using the hardware-based controller;
transmitting power consumption and security data to a first further network device;
receiving a data path assignment from the first further network device based on the transmitted power consumption and security data; and
relaying data from the first further network device to a second further network device based on the path assignment.

18. The method of claim 17, further comprising determining the minimum security attributes, wherein the minimum security attributes is determined based on at least one of a user setting, an application requirement, a service requirement, a protocol requirement and a traffic type, and the minimum security attributes includes at least one of an encryption algorithm, a key exchange method, and a key length.

19. The method of claim 17, further comprising determining a lowest power consumption of available media types having the minimum security attributes.

20. The method of claim 17, further comprising:
determining a power rating metric of the network device, wherein determining the network path is performed based on the determined power rating metric and the minimum security attributes.

21. The method of claim 17, wherein determining the network path further comprises determining a network path having a lowest power consumption of security measures that meet the minimum security attributes.

* * * * *